United States Patent
Malladi et al.

(10) Patent No.: US 11,166,312 B2
(45) Date of Patent: Nov. 2, 2021

(54) CELLULAR VEHICLE-TO-EVERYTHING DESIGN PRINCIPLES

(71) Applicant: QUALCOMM Incorporated, San Diego, CA (US)

(72) Inventors: Durga Prasad Malladi, San Diego, CA (US); Shailesh Patil, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 87 days.

(21) Appl. No.: 15/975,641

(22) Filed: May 9, 2018

(65) Prior Publication Data

US 2018/0332620 A1  Nov. 15, 2018

Related U.S. Application Data

(60) Provisional application No. 62/504,181, filed on May 10, 2017.

(51) Int. Cl.
*H04W 74/08* (2009.01)
*H04W 16/28* (2009.01)
(Continued)

(52) U.S. Cl.
CPC ....... *H04W 74/0816* (2013.01); *H04L 5/0053* (2013.01); *H04W 4/40* (2018.02);
(Continued)

(58) Field of Classification Search
CPC ........... H04W 72/042; H04W 72/0446; H04W 72/04; H04W 72/0406; H04W 72/0413;
(Continued)

(56) References Cited

U.S. PATENT DOCUMENTS

| 9,197,387 | B2* | 11/2015 | Nory | H04L 5/0092 |
| 2009/0262699 | A1* | 10/2009 | Wengerter | H04L 1/0072 |
| | | | | 370/330 |

(Continued)

FOREIGN PATENT DOCUMENTS

| WO | WO-2016017099 A1 | 2/2016 |
| WO | WO-2016078684 A1 | 5/2016 |

OTHER PUBLICATIONS

Broadcom UK LTD: "Co-existence and Mitigation Techniques TR 103 319", ETSI Draft; BRAN(15) 000192R2, European Telecommunications Standards Institute (ETSI), 650, Route Des Lucioles ; F-06921 Sophia-Antipolis ; France, vol. BRAN-Broadband Radio Access Networks, Feb. 7, 2016, XP014267797, Retrieved from the Internet: URL:docbox.etsi.org\bran\bran\05-contributions\2015\bran(15)000192r2_Co-existence_and_Mitigation_Techniques_TR_103_319.doc [retrieved on Feb. 7, 2016], pp. 1-13.

(Continued)

*Primary Examiner* — Sai Aung
(74) *Attorney, Agent, or Firm* — Holland & Hart LLP

(57) ABSTRACT

Methods, systems, and devices for wireless communication are described. A 5G device may decode a control channel transmission of a safety message in a vehicle-to-everything system during a first portion of a time period. The 5G device may identify, based at least in part on the decoding, a pool of resource blocks (RBs) that are available for the time period. The 5G device may select a subset of RBs from the available pool of RBs for a transmission during a second portion of the time period.

26 Claims, 12 Drawing Sheets

(51) Int. Cl.
  *H04W 4/40* (2018.01)
  *H04L 5/00* (2006.01)
  *H04W 72/04* (2009.01)
  *H04W 4/70* (2018.01)
  *H04W 72/02* (2009.01)
  *H04W 84/00* (2009.01)

(52) U.S. Cl.
  CPC ............. *H04W 4/70* (2018.02); *H04W 16/28* (2013.01); *H04W 72/0406* (2013.01); *H04L 5/001* (2013.01); *H04W 72/02* (2013.01); *H04W 84/005* (2013.01)

(58) Field of Classification Search
  CPC . H04W 72/02; H04W 72/0453; H04W 24/02; H04W 24/10; H04W 72/044; H04W 28/0289; H04W 72/0493
  See application file for complete search history.

(56) References Cited

U.S. PATENT DOCUMENTS

| | | | |
|---|---|---|---|
| 2010/0329220 A1* | 12/2010 | Kim | H04W 72/1289 370/336 |
| 2011/0280201 A1* | 11/2011 | Luo | H04W 72/0406 370/329 |
| 2013/0201975 A1* | 8/2013 | Chen | H04L 5/0053 370/336 |
| 2013/0208645 A1* | 8/2013 | Feng | H04W 72/005 370/312 |
| 2014/0036810 A1* | 2/2014 | Harrison | H04W 72/0413 370/329 |
| 2014/0153524 A1* | 6/2014 | Xu | H04L 5/0044 370/329 |
| 2017/0019883 A1 | 1/2017 | Nimbalker et al. | |
| 2017/0041971 A1* | 2/2017 | Kim | H04W 72/12 |
| 2017/0188391 A1* | 6/2017 | Rajagopal | H04W 74/0816 |
| 2018/0176892 A1* | 6/2018 | Kim | H04W 52/386 |
| 2019/0059071 A1* | 2/2019 | Khoryaev | H04W 64/006 |

OTHER PUBLICATIONS

International Search Report and Written Opinion—PCT/US2018/032120—ISA/EPO—dated Sep. 28, 2018 (173870WO).
Partial International Search Report—PCT/US2018/032120—ISA/EPO—dated Aug. 7, 2018 (173870W0).

* cited by examiner

CELLULAR VEHICLE-TO-EVERYTHING DESIGN PRINCIPLES

CROSS REFERENCES

The present Application for Patent claims the benefit of U.S. Provisional Patent Application No. 62/504,181 by Malladi, et al., entitled "Cellular Vehicle-To-Everything Design Principles," filed May 10, 2017, assigned to the assignee hereof, and expressly incorporated herein.

BACKGROUND

The following relates generally to wireless communication, and more specifically to cellular vehicle-to-everything (V2X) design principles.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, that may be otherwise known as user equipment (UE).

Wireless communication systems may include or support networks used for vehicle based communications, also referred to as V2X, vehicle-to-vehicle (V2V) networks, cellular V2X (C-V2X) networks, or other similar networks. Vehicle based communication networks may provide always on telematics where UEs, e.g., vehicle UEs (v-UEs), communicate directly to the network (V2N), to pedestrian UEs (V2P), to infrastructure devices (V2I), and to other v-UEs (e.g., via the network and/or directly). The vehicle based communication networks may support a safe, always-connected driving experience by providing intelligent connectivity where traffic signal/timing, real-time traffic and routing, safety alerts to pedestrians/bicyclist, collision avoidance information, etc., are exchanged.

In some examples, the communications in vehicle based networks may include safety message transmissions (e.g., basic safety message (BSM) transmissions). Such BSM transmissions may use a radio frequency spectrum band that is split into BSM sub-bands and non-BSM sub-bands. In some instances, the sub-bands may be shared between next generation wireless devices (e.g., 5G UEs, 5G v-UEs, etc.) and legacy devices and/or devices operating using different radio access technologies (RATs) or protocols. For example, the 5G devices may share a BSM sub-band and/or non-BSM sub-band with Wi-Fi devices and/or other devices configured for other cellular technologies (e.g., Multi-Fire RAT, licensed access assist, etc.). Sharing of the BSM and/or non-BSM sub-bands may, in some aspects, create conflicts related to resource selection and usage, priorities for safety messages vs non-safety related messages, and the like.

SUMMARY

The described techniques relate to improved methods, systems, devices, or apparatuses that support 5G cellular vehicle-to-everything (V2X) design principles. Generally, the described techniques provide for design principles for 5G devices (e.g., a 5G cellular V2X (5G C-V2X) device) that provide flexible wideband operations, ultra-reliable communications, low latency communications, scheduled and autonomous media access control (MAC) functions, and/or co-channel coexistence within a band or sub-band. In one example, the described techniques provide for opportunistic co-channel coexistence between 5G devices and legacy devices (e.g., Wi-Fi devices, devices configured for long term evolution (LTE) licensed assisted access (LAA) operations, MultiFire operations, etc.) using channels associated with safety message transmissions (e.g., basic safety message (BSM) sub-bands or channels). For example, the 5G device may monitor the channel(s) during a first portion (e.g., the first few symbols) of a time period (e.g., a slot, subframe, etc.) to determine if any legacy devices are transmitting control information. If detected, the 5G device may decode the control transmission for the safety message and identify resource block(s) (RB(s)) that are not being used by the legacy devices. The unused resource blocks may be a pool of available resource blocks and the 5G device may select a subset of resource blocks from the pool of resource blocks to use for transmission during a second portion of the time period. The 5G device may use the subset of resource blocks for safety message transmission without interfering or overlapping with the messages being transmitted by the legacy devices.

In some aspects, the described techniques also provide for prioritized sharing of a channel or sub-band (e.g., a non-BSM sub-band) between 5G devices and legacy devices. Generally, the described techniques provide for the legacy devices to yield to 5G device transmissions (if detected) and, in some example, the legacy devices may set a small transmission opportunity (TxOP) for legacy transmissions to provide rapid access to the shared channel by 5G devices. In one example, the prioritized sharing may include the 5G devices determining that the shared radio frequency spectrum band is being shared with legacy devices using a different radio access technology (RAT) than the 5G devices. The 5G devices may generate a preamble that is decodable by the legacy devices (e.g., a Wi-Fi preamble). The preamble may carry or otherwise convey an indication that the 5G device is transmitting a transmission on the shared band. The 5G device may transmit the preamble before the transmission on the shared band. Thus, the preamble may be decodable by the legacy devices (e.g., configured for decoding by the legacy device RAT) and the subsequent transmission may be decodable by other devices using the RAT of the 5G device. The preamble may serve to reserve the shared band for the 5G device and prevent legacy device transmissions.

In another example, the prioritized sharing may include the legacy devices adopting a shorter TxOP when the band is shared with 5G devices. For example, a legacy device may determine that the radio frequency spectrum band is shared with devices using a different RAT than the legacy device. The legacy device may identify the TxOP for the RAT the legacy device is configured for and select a shorter TxOP for future communications using the legacy device RAT on the shared band. In one non-limiting example, the shorter TxOP may be a fraction of the TxOP (e.g., ⅛, ¼, ⅓, ½, etc.) of the TxOP used by the 5G devices. This may provide for an increased number of opportunities for the 5G devices to access the medium for higher priority transmissions.

A method of wireless communication is described. The method may include decoding a control channel transmission of a safety message in a system during a first portion of a time period, identifying, based at least in part on the decoding, a pool of RBs that are available for the time period, and selecting a subset of RBs from the available pool of RBs for a transmission during a second portion of the time period.

An apparatus for wireless communication is described. The apparatus may include means for decoding a control channel transmission of a safety message in a system during a first portion of a time period, means for identifying, based at least in part on the decoding, a pool of RBs that are available for the time period, and means for selecting a subset of RBs from the available pool of RBs for a transmission during a second portion of the time period.

Another apparatus for wireless communication is described. The apparatus may include a processor, memory in electronic communication with the processor, and instructions stored in the memory. The instructions may be operable to cause the processor to decode a control channel transmission of a safety message in a system during a first portion of a time period, identify, based at least in part on the decoding, a pool of RBs that are available for the time period, and select a subset of RBs from the available pool of RBs for a transmission during a second portion of the time period.

A non-transitory computer readable medium for wireless communication is described. The non-transitory computer-readable medium may include instructions operable to cause a processor to decode a control channel transmission of a safety message in a system during a first portion of a time period, identify, based at least in part on the decoding, a pool of RBs that are available for the time period, and select a subset of RBs from the available pool of RBs for a transmission during a second portion of the time period.

Some examples of the method, apparatus, and non-transitory computer-readable medium described above may further include processes, features, means, or instructions for monitoring a plurality of channels during the first portion of the time period, the channels associated with control channel transmissions. Some examples of the method, apparatus, and non-transitory computer-readable medium described above may further include processes, features, means, or instructions for decoding the one or more control channels based at least in part on the monitoring.

Some examples of the method, apparatus, and non-transitory computer-readable medium described above may further include processes, features, means, or instructions for determining, based at least in part on the decoding, a time and frequency resources allocated for data transmissions scheduled during the time period and at least one subsequent time period. Some examples of the method, apparatus, and non-transitory computer-readable medium described above may further include processes, features, means, or instructions for identifying the pool of RBs based at least in part on the determining.

Some examples of the method, apparatus, and non-transitory computer-readable medium described above may further include processes, features, means, or instructions for identifying, based at least in part on the decoding, an ordered list of available RBs for the pool of RBs. Some examples of the method, apparatus, and non-transitory computer-readable medium described above may further include processes, features, means, or instructions for selecting, according to the ordered list, the subset of RBs.

Some examples of the method, apparatus, and non-transitory computer-readable medium described above may further include processes, features, means, or instructions for selecting, according to a random selection scheme, the subset of RBs.

Some examples of the method, apparatus, and non-transitory computer-readable medium described above may further include processes, features, means, or instructions for hashing, based at least in part on a UE identifier and a RB index, the RBs in the pool of RBs. Some examples of the method, apparatus, and non-transitory computer-readable medium described above may further include processes, features, means, or instructions for selecting, according to the hashing, the subset of RBs.

Some examples of the method, apparatus, and non-transitory computer-readable medium described above may further include processes, features, means, or instructions for selecting the subset of RBs according to an ordered list of the RBs in the pool of RBs, a random selection scheme, a RB index hashed to a UE identifier, or combinations thereof.

In some examples of the method, apparatus, and non-transitory computer-readable medium described above, the transmission during the second portion of the time period comprises a unicast transmission, a broadcast transmission, or combinations thereof.

In some examples of the method, apparatus, and non-transitory computer-readable medium described above, the transmission during the second portion of the time period comprises a transmission.

A method of wireless communication is described. The method may include identifying, by a first device configured to communicate using a first RAT, a shared radio frequency spectrum band that is shared between the first device and a second device that is configured to communicate using a second RAT, generating a preamble for transmission on the shared radio frequency spectrum band, the preamble configured to be decodable by the second device of the second RAT and conveying an indication of a transmission by the first device using the first RAT, and transmitting the configured preamble prior to the transmission using the first RAT.

An apparatus for wireless communication is described. The apparatus may include means for identifying, by a first device configured to communicate using a RAT, a shared radio frequency spectrum band that is shared between the first device and a second device that is configured to communicate using a second RAT, means for generating a preamble for transmission on the shared radio frequency spectrum band, the preamble configured to be decodable by the second device of the second RAT and conveying an indication of a transmission by the first device using the first RAT, and means for transmitting the configured preamble prior to the transmission using the first RAT.

Another apparatus for wireless communication is described. The apparatus may include a processor, memory in electronic communication with the processor, and instructions stored in the memory. The instructions may be operable to cause the processor to identify, by a first device configured to communicate using a first RAT, a shared radio frequency spectrum band that is shared between the first device and a second device that is configured to communicate using a second RAT, generate a preamble for transmission on the shared radio frequency spectrum band, the preamble configured to be decodable by the second device of the second RAT and conveying an indication of a transmission by the first device using the first RAT, and transmit the configured preamble prior to the transmission using the first RAT.

A non-transitory computer readable medium for wireless communication is described. The non-transitory computer-readable medium may include instructions operable to cause a processor to identify, by a first device configured to communicate using a first RAT, a shared radio frequency spectrum band that is shared between the first device and a second device that is configured to communicate using a second RAT, generate a preamble for transmission on the shared radio frequency spectrum band, the preamble configured to be decodable by the second device of the second RAT and conveying an indication of a transmission by the first device using the first RAT, and transmit the configured preamble prior to the transmission using the first RAT.

Some examples of the method, apparatus, and non-transitory computer-readable medium described above may further include processes, features, means, or instructions for configuring at least one of a network allocation vector (NAV) or a TxOP parameter in the preamble to convey an indication of a transmission duration for the transmission by the first device using the first RAT.

In some examples of the method, apparatus, and non-transitory computer-readable medium described above, the first RAT may have a higher transmission priority than the second RAT.

In some examples of the method, apparatus, and non-transitory computer-readable medium described above, the first RAT comprises a RAT and the second RAT comprises one or more of a Wi-Fi RAT, a LTE license assisted access (LTE-LAA) RAT, an enhanced LTE-LAA RAT, and a multi-fire RAT.

Some examples of the method, apparatus, and non-transitory computer-readable medium described above may further include processes, features, means, or instructions for selecting a bandwidth for the transmission by the first device using the first RAT. Some examples of the method, apparatus, and non-transitory computer-readable medium described above may further include processes, features, means, or instructions for configuring the preamble to convey an indication of the bandwidth.

Some examples of the method, apparatus, and non-transitory computer-readable medium described above may further include processes, features, means, or instructions for performing a listen-before-talk (LBT) procedure prior to the transmission by the first device using the first RAT. Some examples of the method, apparatus, and non-transitory computer-readable medium described above may further include processes, features, means, or instructions for performing a backoff procedure when the LBT procedure indicates that the shared radio frequency spectrum band may be occupied.

In some examples of the method, apparatus, and non-transitory computer-readable medium described above, the transmission by the first device using the first RAT comprises a unicast transmission, a broadcast transmission, or combinations thereof.

In some examples of the method, apparatus, and non-transitory computer-readable medium described above, the transmission by the first device using the first RAT comprises a transmission.

A method of wireless communication is described. The method may include identifying a shared radio frequency spectrum band that is shared between a first device that is configured to communicate using a first RAT and a second device that is configured to communicate using a second RAT, identifying, by the second device, a first TxOP duration associated with the first RAT, and selecting, based at least in part on the first TxOP duration, a second TxOP duration for communications on the shared radio frequency spectrum band, wherein the second TxOP duration is smaller than the first TxOP duration.

An apparatus for wireless communication is described. The apparatus may include means for identifying a shared radio frequency spectrum band that is shared between a first device that is configured to communicate using a first RAT and a second device that is configured to communicate using a second RAT, means for identifying, by the second device, a first TxOP duration associated with the first RAT, and means for selecting, based at least in part on the first TxOP duration, a second TxOP duration for communications on the shared radio frequency spectrum band, wherein the second TxOP duration is smaller than the first TxOP duration.

Another apparatus for wireless communication is described. The apparatus may include a processor, memory in electronic communication with the processor, and instructions stored in the memory. The instructions may be operable to cause the processor to identify a shared radio frequency spectrum band that is shared between a first device that is configured to communicate using a first RAT and a second device that is configured to communicate using a second RAT, identify, by the second device, a first TxOP duration associated with the first RAT, and select, based at least in part on the first TxOP duration, a second TxOP duration for communications on the shared radio frequency spectrum band, wherein the second TxOP duration is smaller than the first TxOP duration.

A non-transitory computer readable medium for wireless communication is described. The non-transitory computer-readable medium may include instructions operable to cause a processor to identify a shared radio frequency spectrum band that is shared between a first device that is configured to communicate using a first RAT and a second device that is configured to communicate using a second RAT, identify, by the second device, a first TxOP duration associated with the first RAT, and select, based at least in part on the first TxOP duration, a second TxOP duration for communications on the shared radio frequency spectrum band, wherein the second TxOP duration is smaller than the first TxOP duration.

Some examples of the method, apparatus, and non-transitory computer-readable medium described above may further include processes, features, means, or instructions for performing one or more communications on the shared radio frequency spectrum band using the second TxOP.

In some examples of the method, apparatus, and non-transitory computer-readable medium described above, the first RAT comprises a RAT and the second RAT comprises one or more of a Wi-Fi RAT, a LTE-LAA RAT, an enhanced LTE-LAA RAT, and a multi-fire RAT.

DETAILED DESCRIPTION

Figure 1:
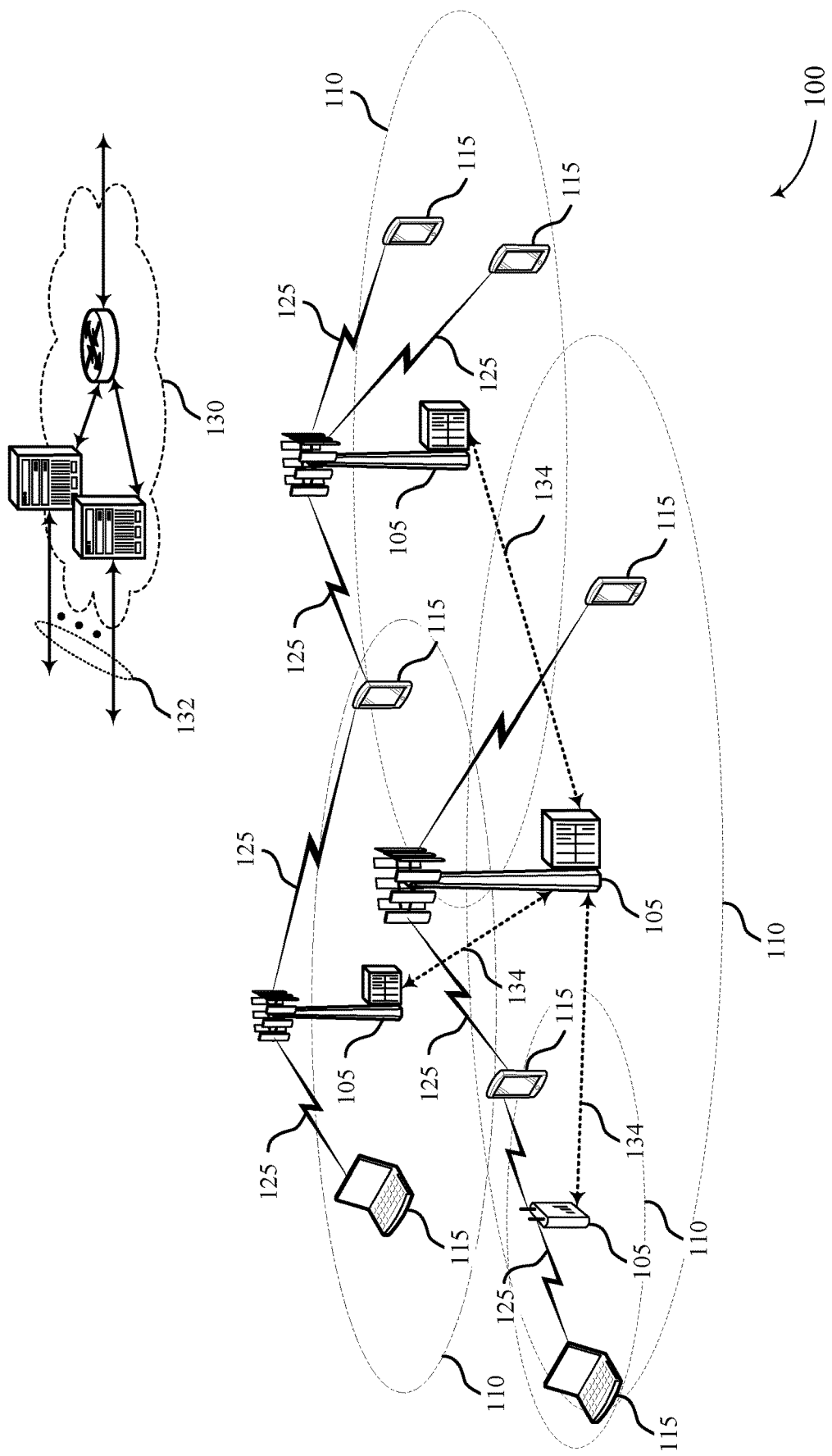
FIG. 1 illustrates an example of a system for wireless communication that supports 5G cellular vehicle-to-everything (V2X) design principles in accordance with aspects of the present disclosure.

Aspects of the described techniques may provide for resource selection by 5G devices and/or prioritized sharing of a shared radio frequency spectrum band. Certain radio frequency spectrum bands may be split and used for different purposes. As one example, an intelligent transport services (ITS) band may be split into a basic safety message (BSM) band and a non-BSM band (or channels). The BSM and the non-BSM channels may each have their own associated time spacing, transmission opportunity (TxOP), bandwidth characteristics, and the like. In some examples, the BSM and/or non-BSM channels may be a radio frequency spectrum band that is shared between legacy devices (e.g., Wi-Fi devices, MultiFire devices, etc.) and next generation devices (e.g., 5G cellular vehicle-to-everything (5G C-V2X) devices). The 5G devices may use the BSM and, in some examples, the non-BSM channels for wireless transmissions of safety messages that are unicast and/or broadcast transmissions.

Aspects of the disclosure are initially described in the context of a wireless communications system, such as a vehicle based wireless network. In some aspects, a 5G device may select resource blocks to use for wireless transmissions by listening to control channel transmissions of legacy devices to identify available resource blocks (RBs). For example, the 5G device may decode control channel transmissions for safety messages transmitted on the shared band. The control channel transmissions may be decoded during a first portion of a time period (e.g., the first one, two, three, etc. symbol periods) and may include an indication of which time-frequency resources (e.g., resource blocks) the transmitting legacy device is using for transmission. Based on the decoded control channel(s), the 5G may identify which resource blocks are available for a second portion of the time period (e.g., the remaining symbol periods of the slot, subframe, frame, etc.), that may form a pool of available resource blocks. The 5G device may select a subset of resource blocks from the pool of available resource blocks to use for transmission during the second portion of the time period, e.g., a sufficient number of resource blocks to transmit the buffered information.

In some aspects, the 5G device may provide for prioritized sharing by using a preamble configured for the legacy devices to reserve the resource(s) of the channel(s) for the 5G device. For example, the 5G device may be configured to communicate using an advanced radio access technology (RAT), e.g., a first RAT. The 5G device may identify or otherwise determine that the band is being shared with legacy devices configured to operating using a second RAT. The 5G device may generate and transmit a preamble that is decodable by the legacy devices using the second RAT (e.g., a legacy preamble) that carries or otherwise conveys an indication of a transmission by the 5G device using the first RAT. The preamble may be decoded by the legacy devices, that serves to prevent the legacy devices from using the resources reserved by the 5G device.

In some aspects, the legacy device may support prioritized sharing by adopting a shorter TxOP when operating on a channel that is shared by 5G device(s). For example, the legacy device may identify or otherwise determine that the radio frequency spectrum band is shared with 5G devices (e.g., devices configured for the first RAT). The legacy device may identify the TxOP for the second RAT and select a shorter (or smaller) TxOP duration for communications on the shared band. The shorter TxOP may provide for an increased number of opportunities for the 5G device to capture the shared band.

Aspects of the disclosure are further illustrated by and described with reference to apparatus diagrams, system diagrams, and flowcharts that relate to 5G cellular V2X design principles.

FIG. 1 illustrates an example of a wireless communication system 100 in accordance with various aspects of the present disclosure. The wireless communication system 100 includes base stations 105, UEs 115, and a core network 130. In some examples, the wireless communications system 100 may be a Long Term Evolution (LTE), LTE-Advanced (LTE-A) network, or a 5th Generation (5G)/New Radio (NR) network. In some cases, wireless communications system 100 may support enhanced broadband communications, ultra-reliable (i.e., mission critical) communications, low latency communications, and communications with low-cost and low-complexity devices.

Base stations 105 may wirelessly communicate with UEs 115 via one or more base station antennas. Each base station 105 may provide communication coverage for a respective geographic coverage area 110. Communication links 125 shown in wireless communication system 100 may include uplink transmissions from a UE 115 to a base station 105, or downlink transmissions, from a base station 105 to a UE 115. Control information and data may be multiplexed on an uplink channel or a downlink channel according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communication system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of Things (IoT) device, an Internet of Everything (IoE) device, a machine type communication (MTC) device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in that each UE 115 transmits to every other UE 115 in the group. In some cases, a base station 105 facilitates the scheduling of resources for D2D communications. In other cases, D2D communications are carried out independent of a base station 105. Another example of direct UE-115 communications may include V2X and/or V2V communications. Thus, references to a vehicle may refer to a UE 115 where the vehicle is equipped to perform wireless communications using the described techniques.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communications system may be configured to provide ultra-reliable communications for these functions.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as evolved NodeBs (eNBs) 105.

A base station 105 may be connected by an S1 interface to the core network 130. The core network may be an evolved packet core (EPC), that may include at least one mobility management entity (MME), at least one serving gateway (S-GW), and at least one Packet Data Network (PDN) gateway (P-GW). The MME may be the control node that processes the signaling between the UE 115 and the EPC. All user Internet Protocol (IP) packets may be transferred through the S-GW, that itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service.

The core network 130 may provide user authentication, access authorization, tracking, IP connectivity, and other access, routing, or mobility functions. At least some of the network devices, such as base station 105 may include subcomponents such as an access network entity, that may be an example of an access node controller (ANC). Each access network entity may communicate with a number of UEs 115 through a number of other access network transmission entities, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communication system 100 may operate in an ultra-high frequency (UHF) frequency region using frequency bands from 700 MHz to 2600 MHz (2.6 GHz), although some networks (e.g., a wireless local area network (WLAN)) may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communication system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Thus, wireless communication system 100 may support millimeter wave (mmW) communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (that may also be referred to as spatial filtering or directional transmission) is a signal processing technique that may be used at a transmitter (e.g., a base station 105) to shape and/or steer an overall antenna beam in the direction of a target receiver (e.g., a UE 115). This may be achieved by combining elements in an antenna array in such a way that transmitted signals at particular angles experience constructive interference while others experience destructive interference.

In some cases, the antennas of a base station 105 or UE 115 may be located within one or more antenna arrays, that may support beamforming or multiple-input/multiple-output (MIMO) operations. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

In some cases, wireless communication system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid ARQ (HARD) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

Time intervals in LTE or NR may be expressed in multiples of a basic time unit. Time resources may be organized according to radio frames of length of 10 ms, that may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a TTI. In other cases, a TTI may be shorter than a subframe or may be dynamically selected (e.g., in short TTI bursts or in selected component carriers using short TTIs).

A resource element may consist of one symbol period and one subcarrier (e.g., a 15 KHz frequency range). A resource block may contain 12 consecutive subcarriers in the frequency domain and, for a normal cyclic prefix in each OFDM symbol, 7 consecutive OFDM symbols in the time domain (1 slot), or 84 resource elements. The number of bits carried by each resource element may depend on the modulation scheme (the configuration of symbols that may be selected during each symbol period). Thus, the more resource blocks that a UE receives and the higher the modulation scheme, the higher the data rate may be.

Wireless communication system 100 may support operation on multiple cells or carriers, a feature that may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

In some cases, wireless communication system 100 may utilize enhanced component carriers (eCCs). An eCC may be characterized by one or more features including: wider bandwidth, shorter symbol duration, shorter TTIs, and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, that may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds). A TTI in eCC may consist of one or multiple symbols. In some cases, the TTI duration (that is, the number of symbols in a TTI) may be variable.

A shared radio frequency spectrum band may be utilized in an NR shared spectrum system. For example, an NR shared spectrum may utilize any combination of licensed, shared, and unlicensed spectrums, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some cases, wireless communication system 100 may utilize both licensed and unlicensed radio frequency spectrum bands. For example, wireless communication system 100 may employ LTE License Assisted Access (LTE-LAA) or LTE Unlicensed (LTE U) radio access technology or NR technology in an unlicensed band such as the 5 Ghz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on frequency division duplexing (FDD), time division duplexing (TDD) or a combination of both.

Wireless communication system 100 may include or support networks used for vehicle based communications, also referred to as V2X, vehicle-to-vehicle (V2V) networks, and/or cellular V2X (C-V2X) networks. Vehicle based communication networks may provide always on telematics where user equipment (UE)s, e.g., v-UEs, communicate directly to the network (V2N), to pedestrian UEs (V2P), to infrastructure devices (V2I), and to other v-UEs (e.g., directly and/or via the network). The vehicle based communication networks may support a safe, always-connected driving experience by providing intelligent connectivity where traffic signal/timing, real-time traffic and routing, safety alerts to pedestrians/bicyclist, collision avoidance information, etc., are exchanged.

Wireless communication system 100 may support aspects of the described design principles for 5G NR C-V2X communications. For example, a UE 115, that may be an example of a V2X device, a 5G NR C-V2X device, a C-V2X device, or simply a 5G device, may be configured to decode control channel transmissions from legacy devices to identify resources to use for wireless communications. The UE 115 may decode a control channel transmission of a safety message in a V2X system during a first portion of a time period. The UE 115 may identify, based on the decoding, a pool of resource blocks that are available for the time period. The UE 115 may select a subset of resource blocks from the available pool of resource blocks for a transmission during a second portion of the time period.

In some aspects, the UE 115 may be configured to support prioritized sharing of a shared radio frequency spectrum band. For example, the UE 115 may be a 5G device and may identify, by the UE 115 that is configured to communicate using a first RAT, a shared radio frequency spectrum band that is shared between the first device and a second device that is configured to communicate using a second RAT. The UE 115 may generate a preamble for transmission on the shared radio frequency spectrum band, the preamble configured to be decodable by the second device (e.g., a legacy device) of the second RAT and may convey an indication of a transmission by the first device using the first RAT. The UE 115 may transmit the configured preamble prior to the transmission using the first RAT.

In some aspects, the UE 115 may be a legacy device that supports prioritized sharing of a shared radio frequency spectrum band. For example, the UE 115 may be a Wi-Fi device, a LAA device, a MultiFire device, or some other devices configured to communicate in the second RAT. The UE 115 may identify a shared radio frequency spectrum band that is shared between a first device (e.g., a 5G device) that is configured to communicate using a first RAT and a second device that is configured to communicate using a second RAT. The UE 115 may identify a first TxOP duration associated with the first RAT. The UE 115 may select, based at least in part on the first TxOP duration, a second TxOP duration for communications on the shared radio frequency spectrum band. The second TxOP duration may be smaller (or shorter) than the first TxOP duration.

Figure 2:
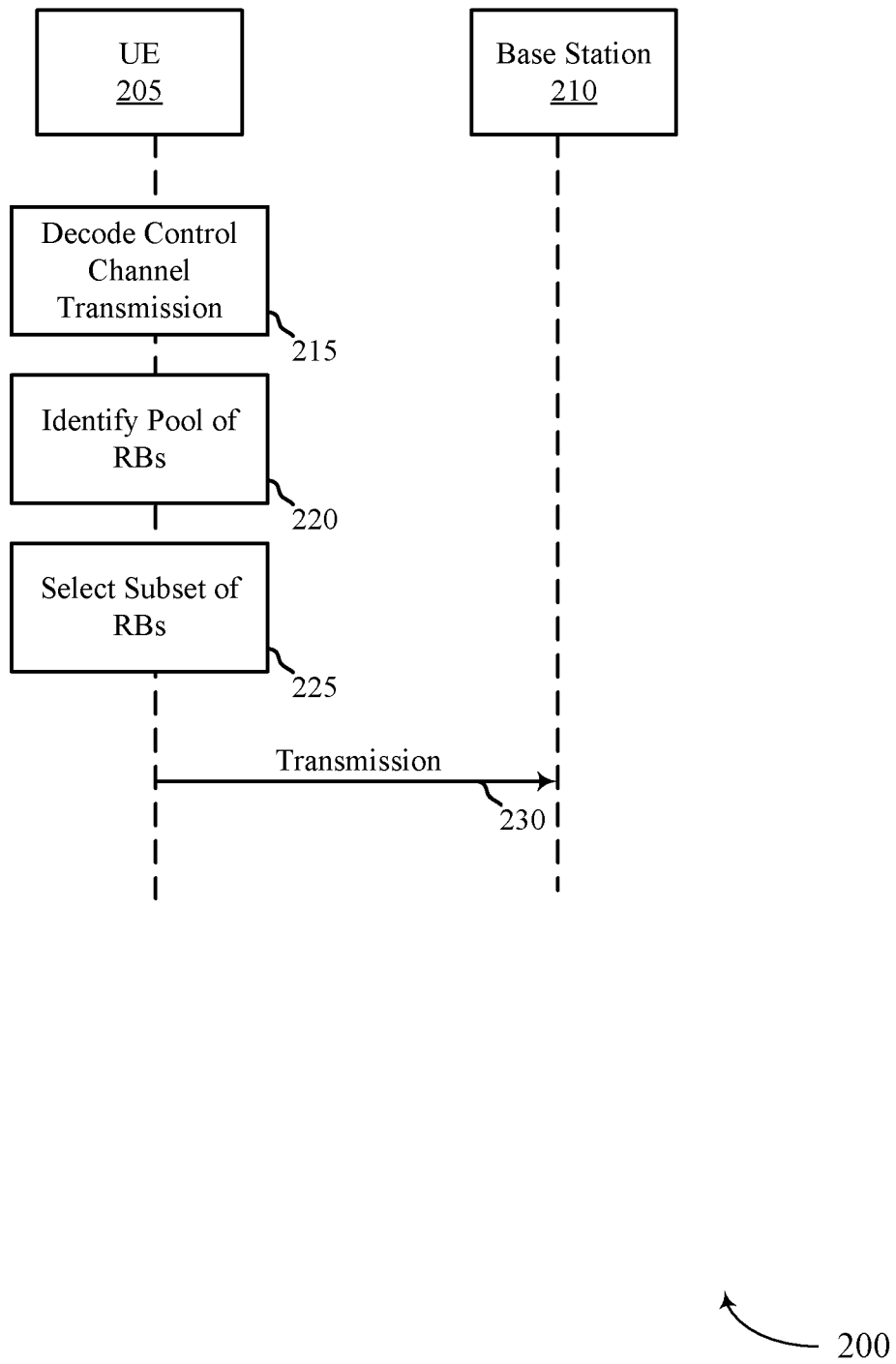
FIG. 2 illustrates an example of a process that supports 5G cellular V2X design principles in accordance with aspects of the present disclosure.

FIG. 2 illustrates an example of a process 200 that supports 5G cellular V2X design principles in accordance with various aspects of the present disclosure. In some examples, process 200 may implement aspects of wireless communication system 100. Process 200 may include a UE 205 and a base station 210, that may be examples of the corresponding devices described herein. The UE 205 may be a 5G device or a 5G C-V2X device.

Generally, process 200 may provide one example for opportunistic co-channel coexistence between UE 205 (e.g., a 5G C-V2X device) and legacy devices (e.g., devices configured for Wi-Fi, LAA, MultiFire, and other types of communication protocols). In some examples, the co-channel coexistence provides a mechanism where UE 205 may decode control channels of legacy devices before performing 5G C-V2X transmissions. For example, UE 205 may perform control channel decoding and avoid resource blocks picked by legacy devices and create a pool of available resource blocks for 5G transmissions. UE 205 may pick resource block(s) from the resource block pool for transmission during the remaining portion of the time period (e.g., using a 1 millisecond or some other duration time period). In some examples, process 200 may be performed for wireless communications in a BSM radio frequency spectrum band.

At 215, UE 205 may decode a control channel transmission of a safety message in a V2X system during a first portion of a time period. The first portion of the time period may include the first one, two, three, etc., symbol periods of the time period (e.g., slot, subframe, frame, etc.). The safety message in the V2X system may include a message transmitted by the legacy devices on BSM channel(s). For example, in some instances UE 205 may monitor multiple (e.g., some or all) channels during the first portion of the time period to detect control channel transmissions from the legacy devices. Based on the monitoring, UE 205 may decode some or all of the detected control channel transmissions from the legacy devices.

At 220, UE 205 may identify a pool of resource blocks that are available for the time period. For example, UE 205 may identify which time-frequency resources are allocated during the remaining or second portion of the time period and, in some instances, subsequent time period(s). That is, in some examples the control channel transmissions may carry or otherwise convey an indication of which time-frequency resources (e.g., resource blocks) that are allocated for wireless transmissions by the legacy devices. The indication may be carried or conveyed in a resource grant, assignment, and the like, in the control channel transmissions. The allocated resources may include resources in the current slot, in the current slot and the next slot of the subframe, in the current subframe and the next subframe, and the like. UE 205 may decode the control channel transmissions to determine which resource blocks are unallocated by the legacy devices and therefore available during the second or remaining portion of the time period (and subsequent time period(s) in some examples).

In some aspects, UE 205 may identify the pool of resource blocks that includes some or all available resource blocks that are available for transmissions. For example, UE 205 may identify the pool of resource blocks that includes unused resource blocks from the current time period and subsequent time period(s). In some examples, the pool of available resource blocks may include all resource blocks that are unallocated for wireless transmissions by the legacy devices.

At 225, UE 205 may select of subset of resource blocks from the pool of available resource blocks for a transmission during a second portion of the time period (and subsequent time period(s), in some examples). The number of resource blocks in the subset of resource blocks may be selected based on the amount of traffic that UE 205 has stored in a buffer.

In some aspects, UE 205 may select the resource blocks for the subset of resource blocks based on an ordered list of the resource blocks in the pool of available resource blocks. For example, UE 205 may associate an identifier associated with each available resource block that is based on the detected energy levels for the corresponding channel, based on the amount of neighboring resource blocks that are allocated by the legacy devices, based on the order in which the resource block is determined available, and the like. UE 205 may select from the pool of available resource blocks based on the ordered list (e.g., based on the order of the identifier) of resource blocks.

In some aspects, UE 205 may select the resource blocks from the pool of available resource blocks based on a random selection scheme. For example, UE 205 may randomly pick from the pool of available resource blocks to select the subset of resource blocks. In some aspects, randomly picking the resource blocks from the pool of available resource blocks may reduce or eliminate the chance that multiple 5G devices may select the same resource blocks to use for 5G transmissions.

In some aspects, UE 205 may select the resource blocks from the pool of available resource blocks based on a hashing function. For example, UE 205 may use a hash function based on the UE 205 identifier and/or a resource block index to identify and select resource blocks for the subset of resource blocks.

In some aspects, UE 205 may select the resource blocks from the pool of available resource blocks based on any combination of the described ordered list of the resource blocks in the pool of available resource blocks, the random selection scheme, and/or on the hashing function using the UE 205 identifier and resource block index.

At 230, the UE 205 may transmit a transmission to the base station 210. Although the transmission is shown as being transmitted to base station 210, it is to be understood that the transmission may be transmitted to other devices, such as other UEs (e.g., 5G C-V2X UEs and/or legacy V2X UEs). The transmission may include a unicast transmission, a broadcast transmission, or both. The transmission may be transmitted during the second portion of the time period (e.g., the remaining symbol periods of the slot) and, in some instances, in subsequent time periods (e.g., a second slot of the subframe, a subsequent subframe, a subsequent frame, and the like).

Figure 3:
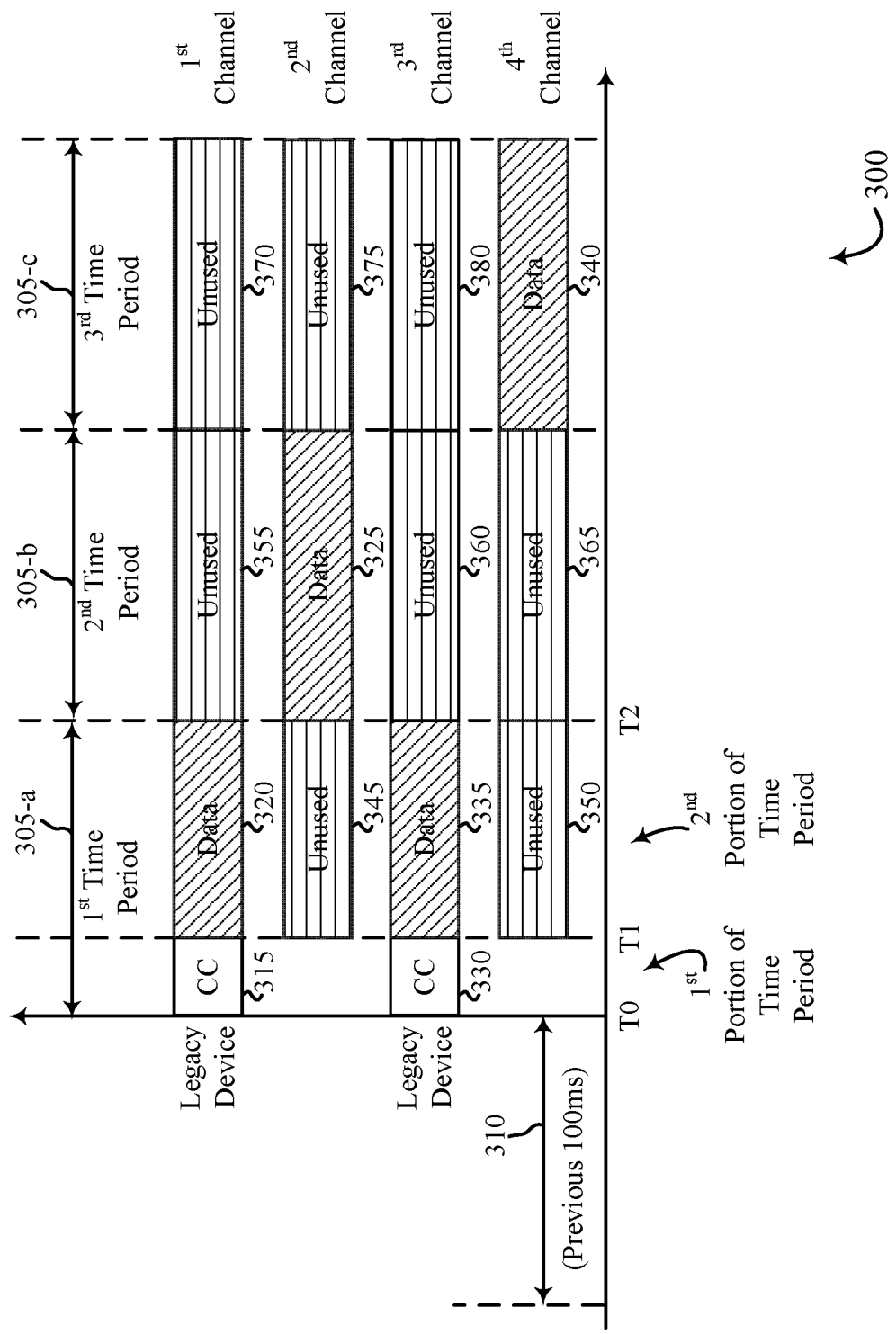
FIG. 3 illustrates an example of a diagram that supports 5G cellular V2X design principles in accordance with aspects of the present disclosure.

FIG. 3 illustrates an example of a diagram 300 that supports 5G cellular V2X design principles in accordance with various aspects of the present disclosure. In some examples, diagram 300 may implement aspects of wireless communication system 100 and/or process 200. Diagram 300 may be implemented by a 5G device, such as a UE, that may be an example of the corresponding devices described herein.

Generally, diagram 300 may include three time periods 305, illustrated as first time period 305-a, second time period 305-b, and third time period 305-c. In some aspects, each time period 305 may be an example of a slot, e.g., a slot separated into fourteen (14) symbol periods. In some aspects, each time period 305 may be an example of a subframe and/or a frame. Diagram 300 may also include a number of channels, with four channels being shown by way of example only. In some examples, diagram 300 may be a BSM band that includes three channels with each channel supporting a 10 MHz bandwidth.

Legacy devices may include Wi-Fi devices and/or cellular devices configured to communicate in other protocols (e.g., LAA, MultiFire, and the like). Such legacy devices may typically monitor a channel for a preceding time period 310, that may be 100 milliseconds in some examples. Based on the historical monitoring, the legacy devices may select resources for wireless communications that include one or more time periods 305 and/or one or more channels. In the example diagram 300, a first legacy device has selected a first channel to use for wireless communications and a second legacy device has selected a third channel to use for wireless communications. During a first portion of the time period 305, e.g., the time between time T0 and time T1, the legacy devices may transmit a control channel transmission for the safety message in the V2X system. Thus, the first legacy device may transmit a first control channel transmission 315 that carries or otherwise conveys an indication that resource blocks 320 and 325 are allocated for transmissions by the first legacy device. Similarly, the second legacy device may transmit a second control channel transmission 330 that carries or otherwise conveys an indication that resource blocks 335 and 340 are allocated for transmissions by the second legacy device.

A UE, e.g., a 5G device, that may also be a 5G C-V2X device, may monitor the first portion of the time period 305 and detect the control channel transmissions 315 and 330. The UE may decode the control channel transmissions and identify a pool of available resource blocks. The pool of available resource blocks may include any unused or otherwise unallocated resources blocks during the second portion of the time period 305-a (e.g., the time between time T1 and time T2) and, in some instances, any subsequent time periods (e.g., the time periods 305-b and/or 305-c). Thus, in one example the pool of available resource blocks may include resource blocks 345 and 350 that occur during the second portion of the time period 305-a. In other examples, the pool of available resource blocks may include some or all of the resource blocks that are unused in the subsequent time period(s) 305. For example, the pool of available resource blocks may include resource blocks 345, 350, 355, 360, and 365 (e.g., the unused resource blocks for the subframe when each time period 305 is a slot). In another examples, the pool of available resource blocks may include resource blocks 345, 350, 355, 360, 365, and 370, e.g., all unused resource blocks.

The UE may select a subset of resource blocks from the pool of available resource blocks. For example, the UE may select the subset of resource blocks using the ordered list of resource blocks, the random selection scheme, the hashing function using the UE identifier and the resource block index, either alone or in any combination. The UE may select a sufficient number of resource blocks for the subset of resource blocks based on the amount of traffic that the UE needs to send.

Although only the first time period 305-a is shown having the first portion and second portions, it is to be understood that any and/or all of the time periods 305 may be divided into the first and second portions. Thus, in one example the UE may detect and decode the control channel transmissions for each time period 305 and then use only the unused resource blocks for that particular time period 305 for 5G wireless transmissions.

Figure 4:
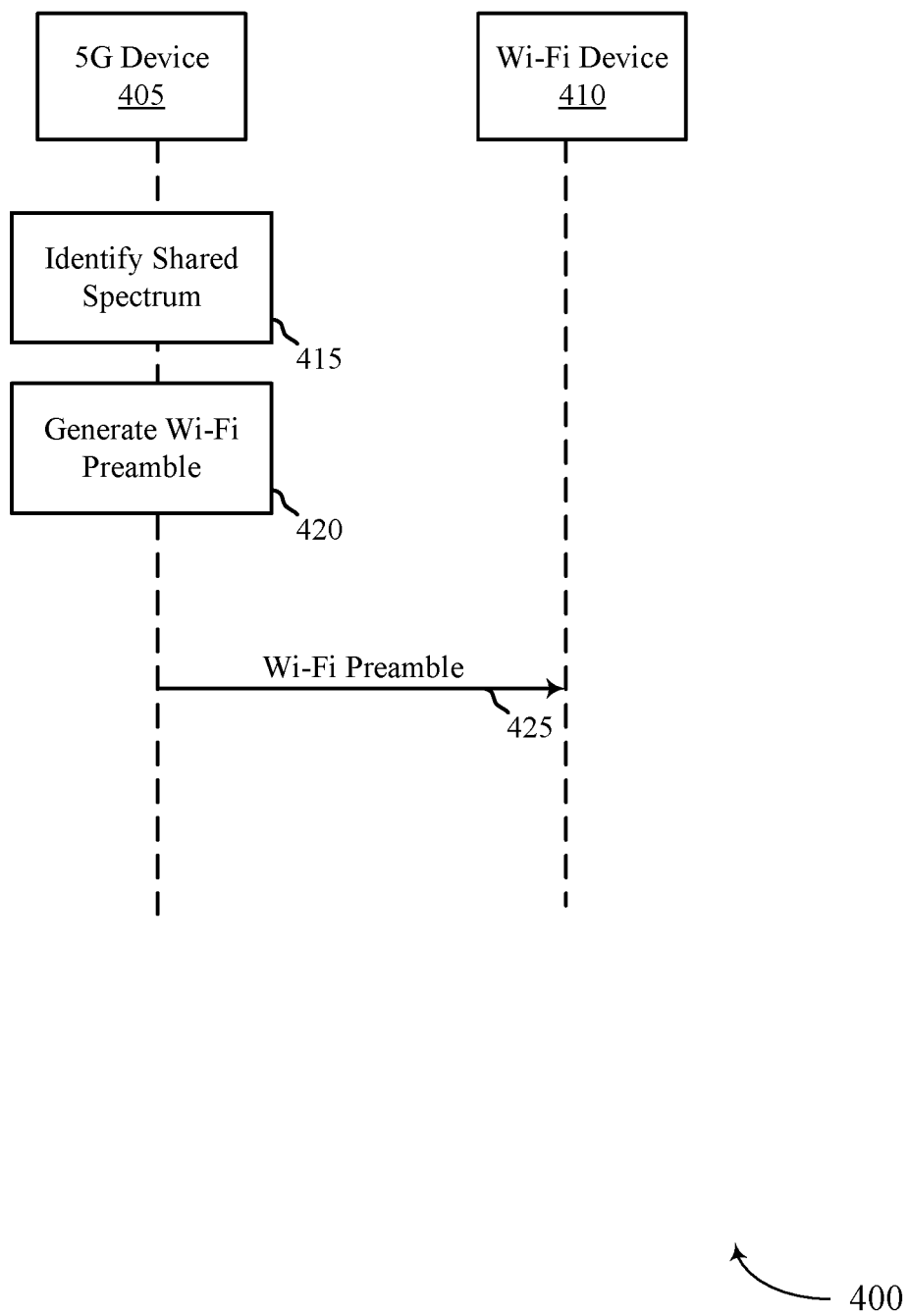
FIG. 4 illustrates an example of a process that supports 5G cellular V2X design principles in accordance with aspects of the present disclosure.

FIG. 4 illustrates an example of a process 400 that supports 5G cellular V2X design principles in accordance with various aspects of the present disclosure. In some examples, process 400 may implement aspects of wireless communication system 100, process 200, and/or diagram 300. Process 400 may include a 5G device 405 and a Wi-Fi device 410.

Generally, the 5G device 405 and/or the Wi-Fi device 410 may be examples of UEs, as is described herein. More particularly, the 5G device 405 may be an example of a next generation UE, a 5G C-V2X device, or simply a V2X configured device. The Wi-Fi device 410 may be an example of a legacy device. Although process 400 illustrates a Wi-Fi device 410 as the legacy device, it is to be understood that any such legacy device may be utilized in addition to or in lieu of Wi-Fi device 410, e.g., a Wi-Fi device configured to communicate using a Wi-Fi RAT, a cellular device configured for communication using a different protocol (e.g., LAA, MultiFire, etc.), and/or a cellular device operating using a different protocol release (e.g., a release 14 configured cellular device). In some aspects, the 5G device 405 may refer to a device configured for V2X communications and the Wi-Fi device 410 may refer to any device that is not configured or otherwise communicating using V2X protocols.

Generally, process 400 illustrates one example for prioritized sharing on channel(s) between the 5G device 405 and the Wi-Fi device 410. In some aspects, the channel(s) may be associated with a non-BSM radio frequency spectrum band. In some aspects, the 5G device 405 may have a higher transmission priority than Wi-Fi device 410. For example, the 5G device 405 may be performing V2X protocol safety message transmissions in a non-BSM band whereas the Wi-Fi device 410 is using the non-BSM band for non-V2X communications. In some aspects, the process 400 illustrates one example where the legacy device (e.g., Wi-Fi device 410) yields to 5G device 405 transmissions.

At 415, 5G device 405 may identify a shared radio frequency spectrum band that is shared between 5G device 405 and Wi-Fi device 410. The 5G device 405 may operate using a RAT that is different from the RAT used by Wi-Fi device 410. In some example, the difference between the first and second RATs may refer to the first RAT used for V2X communications and the second RAT being used for other communications (e.g., non-V2X communications). Other examples of the differences between the RATs may include Wi-Fi vs cellular RATs, cellular RATs using different releases (e.g. release 14 vs release 16), and the like. In some aspects, 5G device 405 may identify or otherwise determine that the band is shared based on monitoring one or more transmissions on the channel(s). For example, 5G device 405 may detect legacy transmissions (e.g., transmissions using a different RAT) on the channel(s) from Wi-Fi device 410.

At 420, 5G device 405 may generate a preamble for transmission on the shared band. The preamble may be decodable by the Wi-Fi device 410 (e.g., a legacy device). The preamble may carry or otherwise convey an indication of a transmission by 5G device 405 using the RAT that 5G device 405 is configured to communicate using (e.g., a V2X RAT). For example, 5G device 405 may configure a network allocation vector (NAV), a TxOP parameter, or other similar parameter in the preamble to convey an indication of a transmission duration for the transmission by 5G device 405 using the first RAT. That is, the preamble may be generated according to the Wi-Fi RAT (e.g., any non-V2X based RAT) protocols such that the preamble can be detected and decoded by any legacy device. The preamble may convey the transmission indication as a resource identifier (e.g., resource block indicator, time-frequency resource indication, and the like) that 5G device 405 will be using for 5G based transmissions.

In some aspects, the 5G based transmission may span a bandwidth of the shared band. For example, the 5G device 405 may select a bandwidth for the transmission and configure the preamble to carry or otherwise convey an indication of the bandwidth.

At 425, 5G device 405 may transmit the configured preamble prior to the transmission using the first RAT, e.g., prior to the V2X or 5G based transmission. Thus, 5G device 405 may transmit the preamble that is decodable by the Wi-Fi device 410 RAT and then the V2X based transmission that is detectable and/or decodable by other 5G devices (e.g., other 5G C-V2X configured devices). The subsequent transmission may be a unicast and/or broadcast transmission. Thus, 5G device 405 may transmit Wi-Fi and/or LAA, eLAA, MultiFire, or any similar legacy preamble prior to any 5G C-V2X transmission. The legacy preambles may enable the non-V2X devices (e.g., legacy devices) inferring the 5G C-V2X transmission times.

In some aspects, 5G device 405 may perform a LBT procedure before the transmission using the first RAT. For example, 5G device 405 may perform the LBT procedure prior to the imminent transmission (e.g., a few microseconds) and may adjust the backoff parameters within a certain window if other 5G C-V2X transmissions are detected.

Figure 5:
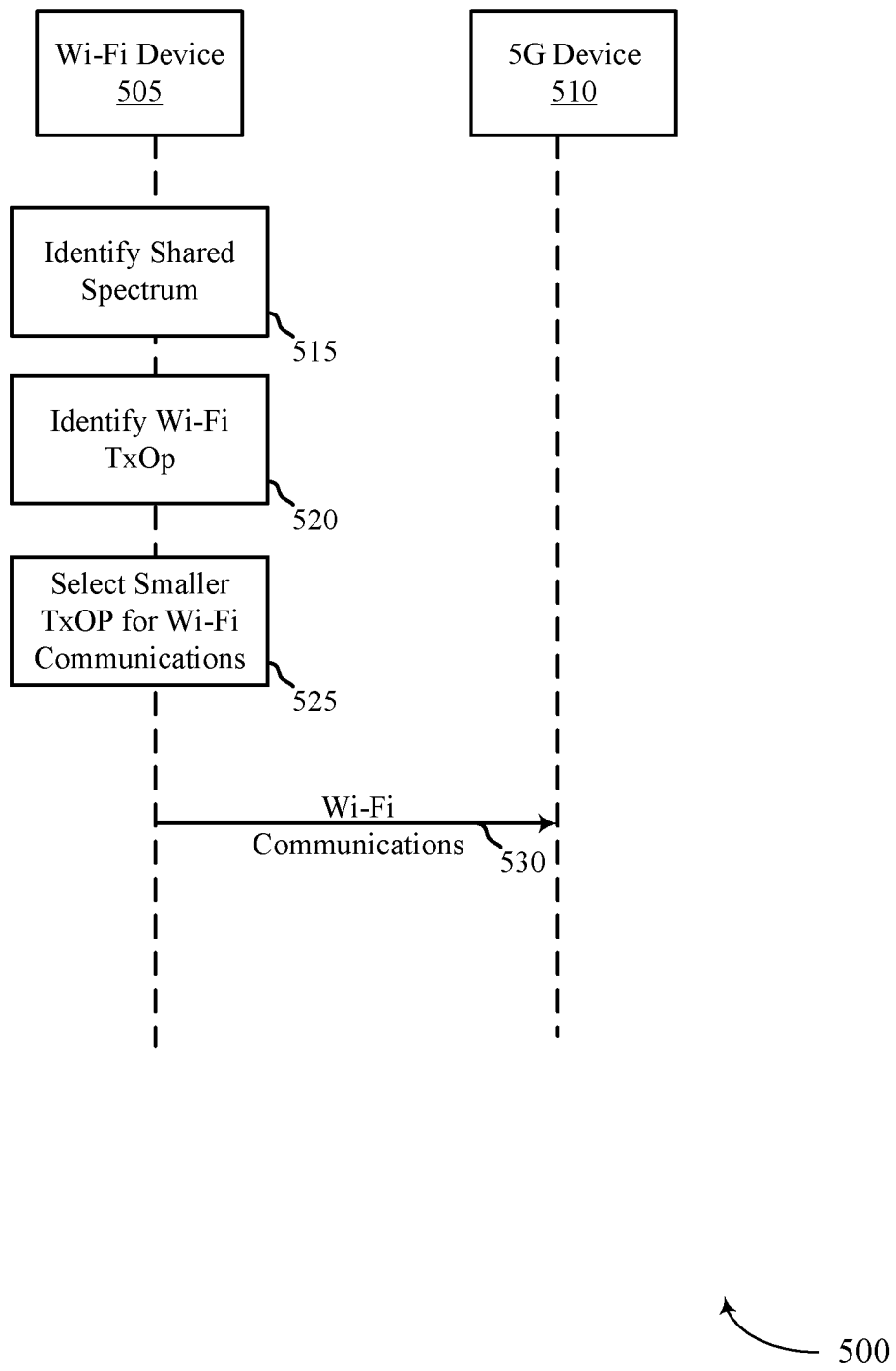
FIG. 5 illustrates an example of a process that supports 5G cellular V2X design principles in accordance with aspects of the present disclosure.

FIG. 5 illustrates an example of a process 500 that supports 5G cellular V2X design principles in accordance with various aspects of the present disclosure. In some examples, process 500 may implement aspects of wireless communication system 100, process 200 and/or 400, and/or diagram 300. Process 500 may include a Wi-Fi device 505 and a 5G device 510.

Generally, the 5G device 510 and/or the Wi-Fi device 505 may be examples of UEs, as is described herein. More particularly, the 5G device 510 may be an example of a next generation UE, a 5G C-V2X device, or simply a V2X configured device. The Wi-Fi device 505 may be an example of a legacy device. Although process 500 illustrates a Wi-Fi device 505 as the legacy device, it is to be understood that any such legacy device may be utilized in addition to or in lieu of Wi-Fi device 505, e.g., a Wi-Fi device configured to communicate using a Wi-Fi RAT, a cellular device configured for communication using a different protocol (e.g., LAA, MultiFire, etc.), and/or a cellular device operating using a different protocol release (e.g., a release 14 configured cellular device). In some aspects, the 5G device 510 may refer to a device configured for V2X communications and the Wi-Fi device 505 may refer to any device that is not configured or otherwise communicating using V2X protocols.

Generally, process 500 illustrates one example for prioritized sharing on channel(s) between the 5G device 510 and the Wi-Fi device 505. In some aspects, the channel(s) may be associated with a non-BSM radio frequency spectrum band. In some aspects, the 5G device 510 may have a higher transmission priority than Wi-Fi device 505. For example, the 5G device 510 may be performing V2X protocol safety message transmissions in a non-BSM band whereas the Wi-Fi device 505 is using the non-BSM band for non-V2X communications. In some aspects, the process 500 illustrates one example where the legacy device (e.g., Wi-Fi device 505) yields to 5G device 510 transmissions by adopting a shorter or smaller TxOP duration. The shorter or smaller TxOP duration provides an increased number of opportunities for the 5G device 510 to capture the medium.

At 515, Wi-Fi device 505 may identify a shared radio frequency spectrum band that is shared between the 5G device 510 and the Wi-Fi device 505. The Wi-Fi device 505 may operate using a RAT that is different from the RAT used by 5G device 510. In some example, the difference between the first and second RATs may refer to the first RAT used for V2X communications and the second RAT being used for other communications (e.g., non-V2X communications). Other examples of the differences between the RATs may include Wi-Fi vs cellular RATs, cellular RATs using different releases (e.g. release 14 vs release 16), and the like. In some aspects, Wi-Fi device 505 may identify or otherwise determine that the band is shared based on monitoring one or more transmissions on the channel(s). For example, Wi-Fi device 505 may detect 5G transmissions (e.g., transmissions using a different RAT) on the channel(s) from 5G device 510.

At 520, Wi-Fi device 505 may identify a first TxOP duration associated with the first RAT. For example, Wi-Fi device 505 may identify or otherwise determine the TxOP duration used by 5G device 510 based on one or more received signals, based on preconfigured information, based on information received from a base station, and the like.

Accordingly, Wi-Fi device 505 may identify which TxOP duration that 5G device 510 (and other 5G devices) are using for 5G transmissions (e.g., C-V2X transmissions). In one non-limiting example, the TxOP duration for the 5G device 510 may be 500 microseconds, 1 millisecond, and the like.

At 525, Wi-Fi device 505 may select a second TxOP duration for communications in the shared radio frequency spectrum band that is shorter (or smaller) than the first TxOP duration. For example, the second TxOP duration may be based on the first TxOP duration and may be selected to allow for 5G device 510 to gain access to the channel for priority communications. For example, the second TxOP duration may be 125 microseconds, in some examples, and may ensure that 5G device 510 will have at least three or more opportunities to capture the channel to perform 5G transmissions. In some aspects, the second TxOP duration may be selected as a percentage of the first TxOP duration, e.g., 15%, 25%, 33%, 50%, and the like. Selection of the second TxOP duration may provide for shorter transmission burst for legacy devices that allows 5G devices to have more opportunities to gain control of the channel.

At 530, Wi-Fi device 505 may perform communication(s) on the shared radio frequency spectrum band using the second TxOP. That is, Wi-Fi device 505 may use the shorter TxOP duration for some or all subsequent legacy communications (e.g., all non C-V2X communications).

Figure 6:
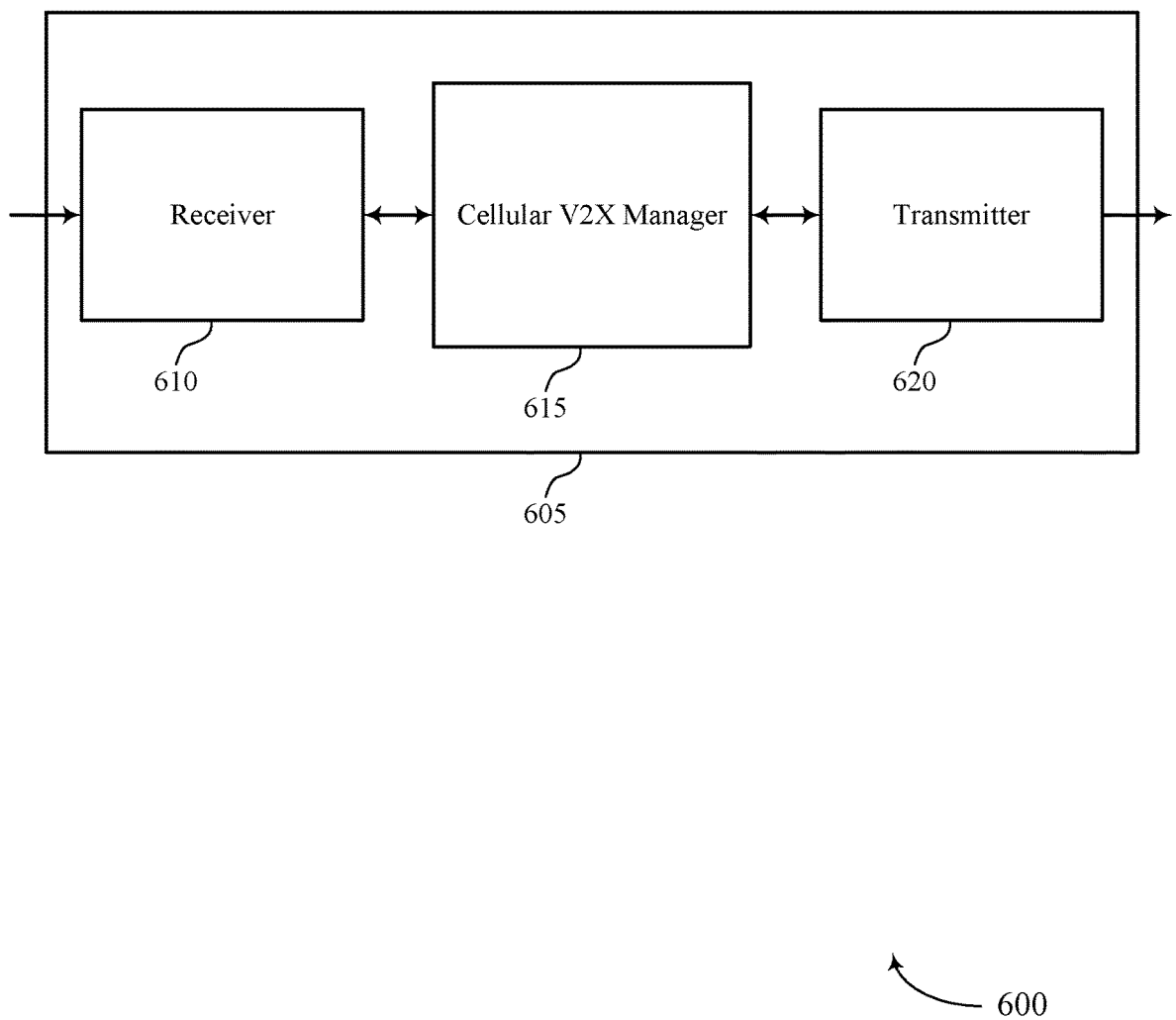
FIGS. 6 through 8 show block diagrams of a device that supports 5G cellular V2X design principles in accordance with aspects of the present disclosure.

FIG. 6 shows a block diagram 600 of a wireless device 605 that supports 5G cellular V2X design principles in accordance with aspects of the present disclosure. Wireless device 605 may be an example of aspects of a UE 115 as described herein, e.g., a 5G device and/or a legacy device. Wireless device 605 may include receiver 610, cellular V2X manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to 5G cellular V2X design principles, etc.). Information may be passed on to other components of the device. The receiver 610 may be an example of aspects of the transceiver 935 described with reference to FIG. 9. The receiver 610 may utilize a single antenna or a set of antennas.

Cellular V2X manager 615 may be an example of aspects of the cellular V2X manager 915 described with reference to FIG. 9.

Cellular V2X manager 615 and/or at least some of its various sub-components may be implemented in hardware, software executed by a processor, firmware, or any combination thereof. If implemented in software executed by a processor, the functions of the cellular V2X manager 615 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The cellular V2X manager 615 and/or at least some of its various sub-components may be physically located at various positions, including being distributed such that portions of functions are implemented at different physical locations by one or more physical devices. In some examples, cellular V2X manager 615 and/or at least some of its various sub-components may be a separate and distinct component in accordance with various aspects of the present disclosure. In other examples, cellular V2X manager 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

In some aspects, cellular V2X manager 615 may decode a control channel transmission of a safety message in a V2X system during a first portion of a time period. Cellular V2X manager 615 may identify, based on the decoding, a pool of resource blocks (RBs) that are available for the time period. Cellular V2X manager 615 may select a subset of RBs from the available pool of RBs for a transmission during a second portion of the time period.

In some aspects, cellular V2X manager 615 may also identify, by a first device configured to communicate using a first RAT, a shared radio frequency spectrum band that is shared between the first device and a second device that is configured to communicate using a second RAT. Cellular V2X manager 615 may generate a preamble for transmission on the shared radio frequency spectrum band, the preamble configured to be decodable by the second device of the second RAT and conveying an indication of a transmission by the first device using the first RAT. Cellular V2X manager 615 may transmit the configured preamble prior to the transmission using the first RAT.

In some aspects, the cellular V2X manager 615 may also identify a shared radio frequency spectrum band that is shared between a first device that is configured to communicate using a first RAT and a second device that is configured to communicate using a second RAT. Cellular V2X manager 615 may identify, by the second device, a first TxOP duration associated with the first RAT. Cellular V2X manager 615 may select, based on the first TxOP duration, a second TxOP duration for communications on the shared radio frequency spectrum band, where the second TxOP duration is smaller than the first TxOP duration.

Transmitter 620 may transmit signals generated by other components of the device. In some examples, the transmitter 620 may be collocated with a receiver 610 in a transceiver module. For example, the transmitter 620 may be an example of aspects of the transceiver 935 described with reference to FIG. 9. The transmitter 620 may utilize a single antenna or a set of antennas.

Figure 7:
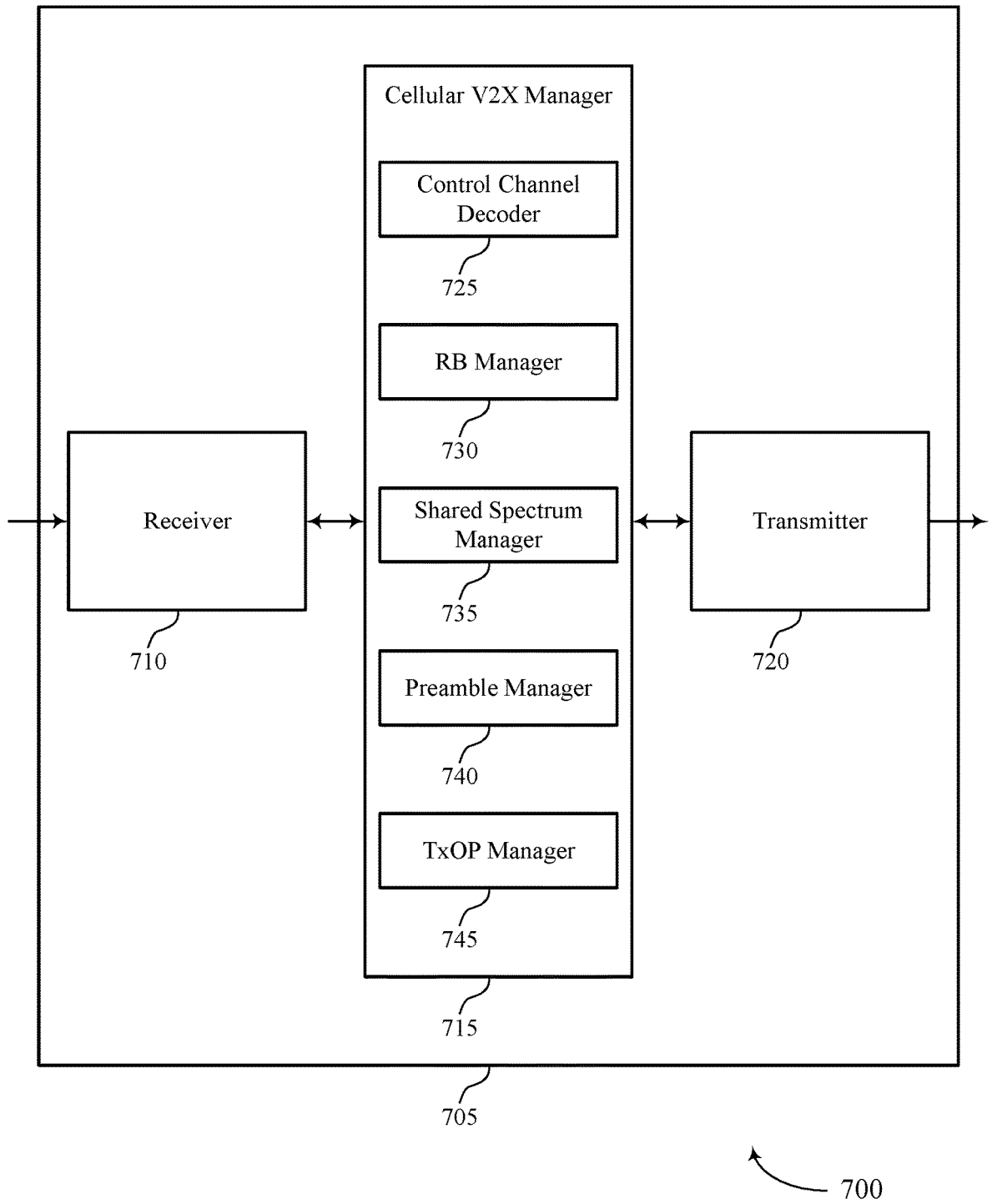

FIG. 7 shows a block diagram 700 of a wireless device 705 that supports 5G cellular V2X design principles in accordance with aspects of the present disclosure. Wireless device 705 may be an example of aspects of a wireless device 605 or a UE 115 as described herein, e.g., a 5G device and/or a legacy device. Wireless device 705 may include receiver 710, cellular V2X manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to 5G cellular V2X design principles, etc.). Information may be passed on to other components of the device. The receiver 710 may be an example of aspects of the transceiver 935 described with reference to FIG. 9. The receiver 710 may utilize a single antenna or a set of antennas.

Cellular V2X manager 715 may be an example of aspects of the cellular V2X manager 915 described with reference to FIG. 9. Cellular V2X manager 715 may also include control channel decoder 725, RB manager 730, shared spectrum manager 735, preamble manager 740, and TxOP manager 745.

Control channel decoder 725 may decode a control channel transmission of a safety message in a V2X system during a first portion of a time period. Control channel decoder 725 may monitor a set of channels during the first portion of the time period, the channels associated with control channel transmissions. Control channel decoder 725 may decode the one or more control channels based on the monitoring.

RB manager 730 may identify, based on the decoding, a pool of RBs that are available for the time period. RB manager 730 may select a subset of RBs from the available pool of RBs for a transmission during a second portion of the time period. RB manager 730 may determine, based on the decoding, a time and frequency resources allocated for data transmissions scheduled during the time period and at least one subsequent time period. RB manager 730 may identify the pool of RBs based on the determining.

Shared spectrum manager 735 may identify, by a first device configured to communicate using a first RAT, a shared radio frequency spectrum band that is shared between the first device and a second device that is configured to communicate using a second RAT. In some cases, the first RAT has a higher transmission priority than the second RAT. In some cases, the first RAT includes a V2X RAT and the second RAT includes one or more of a Wi-Fi RAT, a LTE-LAA) RAT, an enhanced LTE-LAA RAT, and a multi-fire RAT.

Preamble manager 740 may generate a preamble for transmission on the shared radio frequency spectrum band, the preamble configured to be decodable by the second device of the second RAT and conveying an indication of a transmission by the first device using the first RAT. Preamble manager 740 may transmit the configured preamble prior to the transmission using the first RAT. Preamble manager 740 may configure at least one of a NAV or a TxOP parameter in the preamble to convey an indication of a transmission duration for the transmission by the first device using the first RAT.

TxOP manager 745 may identify, by the second device, a first TxOP duration associated with the first RAT. TxOP manager 745 may select, based on the first TxOP duration, a second TxOP duration for communications on the shared radio frequency spectrum band, where the second TxOP duration is smaller than the first TxOP duration. TxOP manager 745 may perform one or more communications on the shared radio frequency spectrum band using the second TxOP.

Transmitter 720 may transmit signals generated by other components of the device. In some examples, the transmitter 720 may be collocated with a receiver 710 in a transceiver module. For example, the transmitter 720 may be an example of aspects of the transceiver 935 described with reference to FIG. 9. The transmitter 720 may utilize a single antenna or a set of antennas.

Figure 8:
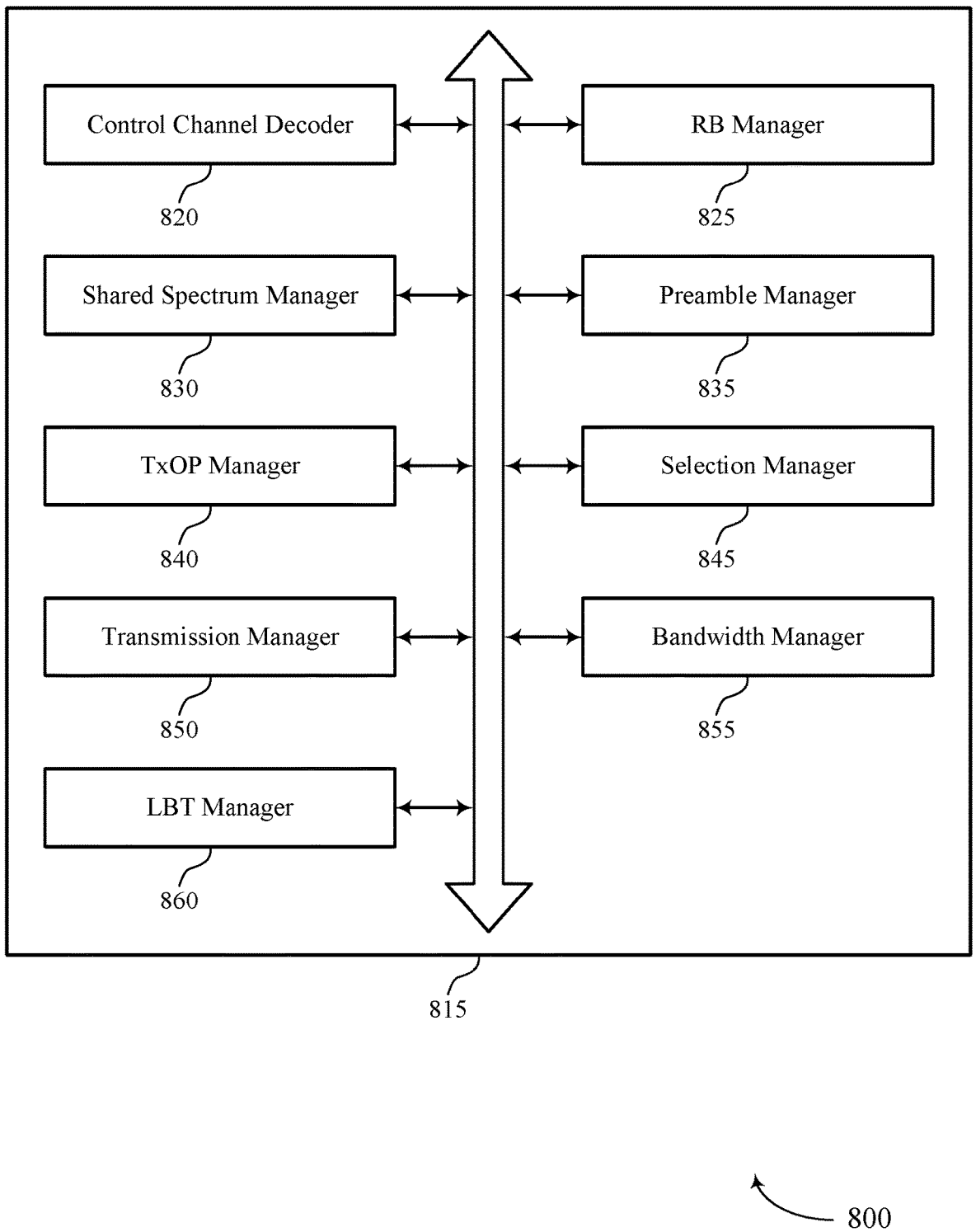

FIG. 8 shows a block diagram 800 of a cellular V2X manager 815 that supports 5G cellular V2X design principles in accordance with aspects of the present disclosure. The cellular V2X manager 815 may be an example of aspects of a cellular V2X manager 615, a cellular V2X manager 715, or a cellular V2X manager 915 described with reference to FIGS. 6, 7, and 9. The cellular V2X manager 815 may include control channel decoder 820, RB manager 825, shared spectrum manager 830, preamble manager 835, TxOP manager 840, selection manager 845, transmission manager 850, bandwidth manager 855, and listen-before-talk (LBT) manager 860. Each of these modules may communicate, directly or indirectly, with one another (e.g., via one or more buses).

Control channel decoder 820 may decode a control channel transmission of a safety message in a V2X system during a first portion of a time period. Control channel decoder 820 may monitor a set of channels during the first portion of the time period, the channels associated with control channel transmissions. Control channel decoder 820 may decode the one or more control channels based on the monitoring.

RB manager 825 may identify, based on the decoding, a pool of RBs that are available for the time period. RB manager 825 may select a subset of RBs from the available pool of RBs for a transmission during a second portion of the time period. RB manager 825 may determine, based on the decoding, a time and frequency resources allocated for data transmissions scheduled during the time period and at least one subsequent time period. RB manager 825 may identify the pool of RBs based on the determining.

Shared spectrum manager 830 may identify, by a first device configured to communicate using a first RAT, a shared radio frequency spectrum band that is shared between the first device and a second device that is configured to communicate using a second RAT. In some cases, the first RAT has a higher transmission priority than the second RAT. In some cases, the first RAT includes a V2X RAT and the second RAT includes one or more of a Wi-Fi RAT, a LTE-LAA RAT, an enhanced LTE-LAA RAT, and a multi-fire RAT.

Preamble manager 835 may generate a preamble for transmission on the shared radio frequency spectrum band, the preamble configured to be decodable by the second device of the second RAT and conveying an indication of a transmission by the first device using the first RAT. Preamble manager 835 may transmit the configured preamble prior to the transmission using the first RAT. Preamble manager 835 may configure at least one of a NAV or a TxOP parameter in the preamble to convey an indication of a transmission duration for the transmission by the first device using the first RAT.

TxOP manager 840 may identify, by the second device, a first TxOP duration associated with the first RAT. TxOP manager 840 may select, based on the first TxOP duration, a second TxOP duration for communications on the shared radio frequency spectrum band, where the second TxOP duration is smaller than the first TxOP duration. TxOP manager 840 may perform one or more communications on the shared radio frequency spectrum band using the second TxOP.

Selection manager 845 may identify, based on the decoding, an ordered list of available RBs for the pool of RBs and select, according to the ordered list, the subset of RBs. Selection manager 845 may select, according to a random selection scheme, the subset of RBs. Selection manager 845 may hash, based on a UE identifier and a RB index, the RBs in the pool of RBs, select, according to the hashing, the subset of RBs. Selection manager 845 may select the subset of RBs according to an ordered list of the RBs in the pool of RBs, a random selection scheme, a RB index hashed to a UE identifier, or combinations thereof.

Transmission manager 850 may monitor, control, or otherwise manage aspects of transmissions for a UE. In some cases, the transmission during the second portion of the time period includes a unicast transmission, a broadcast transmission, or combinations thereof. In some cases, the transmission during the second portion of the time period includes a V2X transmission.

Bandwidth manager 855 may select a bandwidth for the transmission by the first device using the first RAT and configure the preamble to convey an indication of the bandwidth.

LBT manager 860 may perform a LBT procedure prior to the transmission by the first device using the first RAT and perform a backoff procedure when the LBT procedure indicates that the shared radio frequency spectrum band is occupied.

Figure 9:
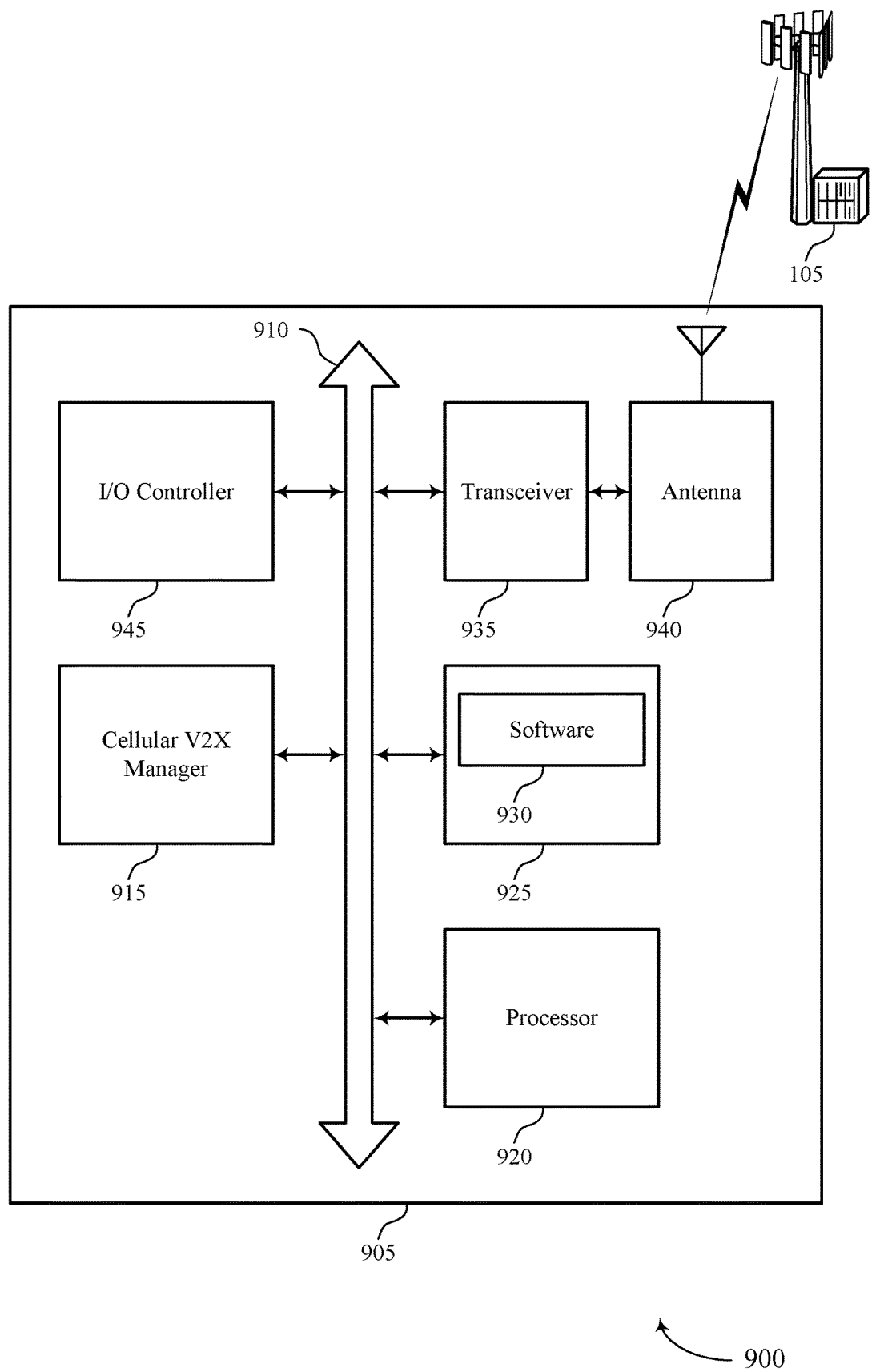
FIG. 9 illustrates a block diagram of a system including a UE that supports 5G cellular V2X design principles in accordance with aspects of the present disclosure.

FIG. 9 shows a diagram of a system 900 including a device 905 that supports 5G cellular V2X design principles in accordance with aspects of the present disclosure. Device 905 may be an example of or include the components of wireless device 605, wireless device 705, or a UE 115 as described herein, e.g., may be a 5G device and/or a legacy device. Device 905 may include components for bi-directional voice and data communications including components for transmitting and receiving communications, including cellular V2X manager 915, processor 920, memory 925, software 930, transceiver 935, antenna 940, and I/O controller 945. These components may be in electronic communication via one or more buses (e.g., bus 910). Device 905 may communicate wirelessly with one or more base stations 105.

Processor 920 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting 5G cellular V2X design principles).

Memory 925 may include random access memory (RAM) and read only memory (ROM). The memory 925 may store computer-readable, computer-executable software 930 including instructions that, when executed, cause the processor to perform various functions described herein. In some cases, the memory 925 may contain, among other things, a basic input/output system (BIOS) that may control basic hardware or software operation such as the interaction with peripheral components or devices.

Software 930 may include code to implement aspects of the present disclosure, including code to support 5G cellular V2X design principles. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas, wired, or wireless links as described above. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas.

In some cases, the wireless device may include a single antenna 940. However, in some cases the device may have more than one antenna 940, that may be capable of concurrently transmitting or receiving multiple wireless transmissions.

I/O controller 945 may manage input and output signals for device 905. I/O controller 945 may also manage peripherals not integrated into device 905. In some cases, I/O controller 945 may represent a physical connection or port to an external peripheral. In some cases, I/O controller 945 may utilize an operating system such as iOS®, ANDROID®, MS-DOS®, MS-WINDOWS®, OS/2®, UNIX®, LINUX®, or another known operating system. In other cases, I/O controller 945 may represent or interact with a modem, a keyboard, a mouse, a touchscreen, or a similar device. In some cases, I/O controller 945 may be implemented as part of a processor. In some cases, a user may interact with device 905 via I/O controller 945 or via hardware components controlled by I/O controller 945.

Figure 10:
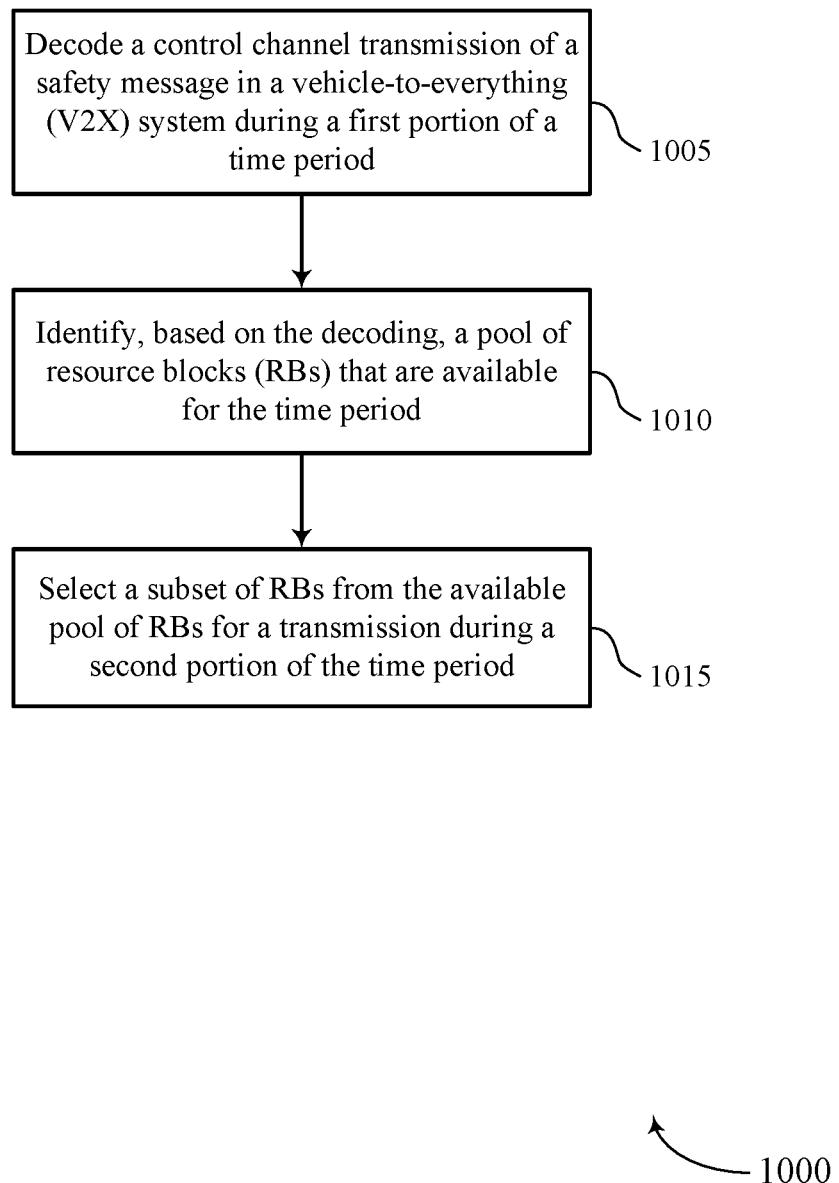
FIGS. 10 through 12 illustrate methods for 5G cellular V2X design principles in accordance with aspects of the present disclosure.

FIG. 10 shows a flowchart illustrating a method 1000 for 5G cellular V2X design principles in accordance with aspects of the present disclosure. The operations of method 1000 may be implemented by a UE 115 or its components as described herein. For example, the operations of method 1000 may be performed by a cellular V2X manager as described with reference to FIGS. 6 through 9. In some examples, a UE 115 may execute a set of codes to control the functional elements of the device to perform the functions described below. Additionally, the UE 115 may perform aspects of the functions described below using special-purpose hardware. In some aspects, the operations of method 1000 may be implemented by a UE 115 configured as a 5G device, e.g., configured for C-V2X communications.

At block 1005 the UE 115 may decode a control channel transmission of a safety message in a V2X system during a first portion of a time period. The operations of block 1005 may be performed according to the methods described herein. In certain examples, aspects of the operations of block 1005 may be performed by a control channel decoder as described with reference to FIGS. 6 through 9.

At block 1010 the UE 115 may identify, based at least in part on the decoding, a pool of RBs that are available for the time period. The operations of block 1010 may be performed according to the methods described herein. In certain examples, aspects of the operations of block 1010 may be performed by a RB manager as described with reference to FIGS. 6 through 9.

At block 1015 the UE 115 may select a subset of RBs from the available pool of RBs for a transmission during a second portion of the time period. The operations of block 1015 may be performed according to the methods described herein. In certain examples, aspects of the operations of block 1015 may be performed by a RB manager as described with reference to FIGS. 6 through 9.

Figure 11:
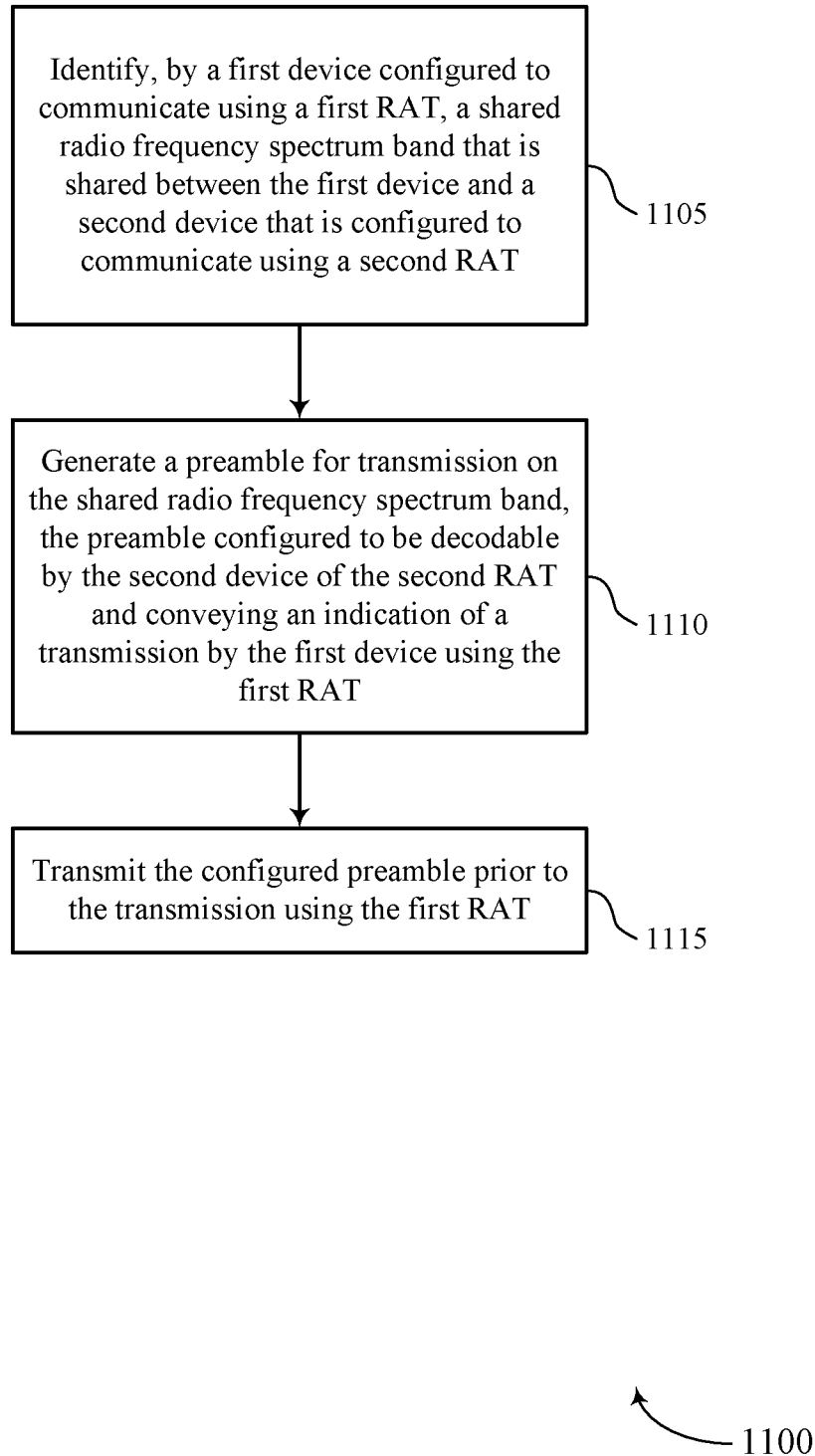

FIG. 11 shows a flowchart illustrating a method 1100 for 5G cellular V2X design principles in accordance with aspects of the present disclosure. The operations of method 1100 may be implemented by a UE 115 or its components as described herein. For example, the operations of method 1100 may be performed by a cellular V2X manager as described with reference to FIGS. 6 through 9. In some examples, a UE 115 may execute a set of codes to control the functional elements of the device to perform the functions described below. Additionally, the UE 115 may perform aspects of the functions described below using special-purpose hardware. In some aspects, the operations of method 1100 may be implemented by a UE 115 configured as a 5G device, e.g., configured for C-V2X communications.

At block 1105 the UE 115 may identify, by a first device configured to communicate using a first RAT, a shared radio frequency spectrum band that is shared between the first device and a second device that is configured to communicate using a second RAT. The operations of block 1105 may be performed according to the methods described herein. In certain examples, aspects of the operations of block 1105 may be performed by a shared spectrum manager as described with reference to FIGS. 6 through 9.

At block 1110 the UE 115 may generate a preamble for transmission on the shared radio frequency spectrum band, the preamble configured to be decodable by the second device of the second RAT and conveying an indication of a transmission by the first device using the first RAT. The operations of block 1110 may be performed according to the methods described herein. In certain examples, aspects of the operations of block 1110 may be performed by a preamble manager as described with reference to FIGS. 6 through 9.

At block 1115 the UE 115 may transmit the configured preamble prior to the transmission using the first RAT. The operations of block 1115 may be performed according to the methods described herein. In certain examples, aspects of the operations of block 1115 may be performed by a preamble manager as described with reference to FIGS. 6 through 9.

Figure 12:
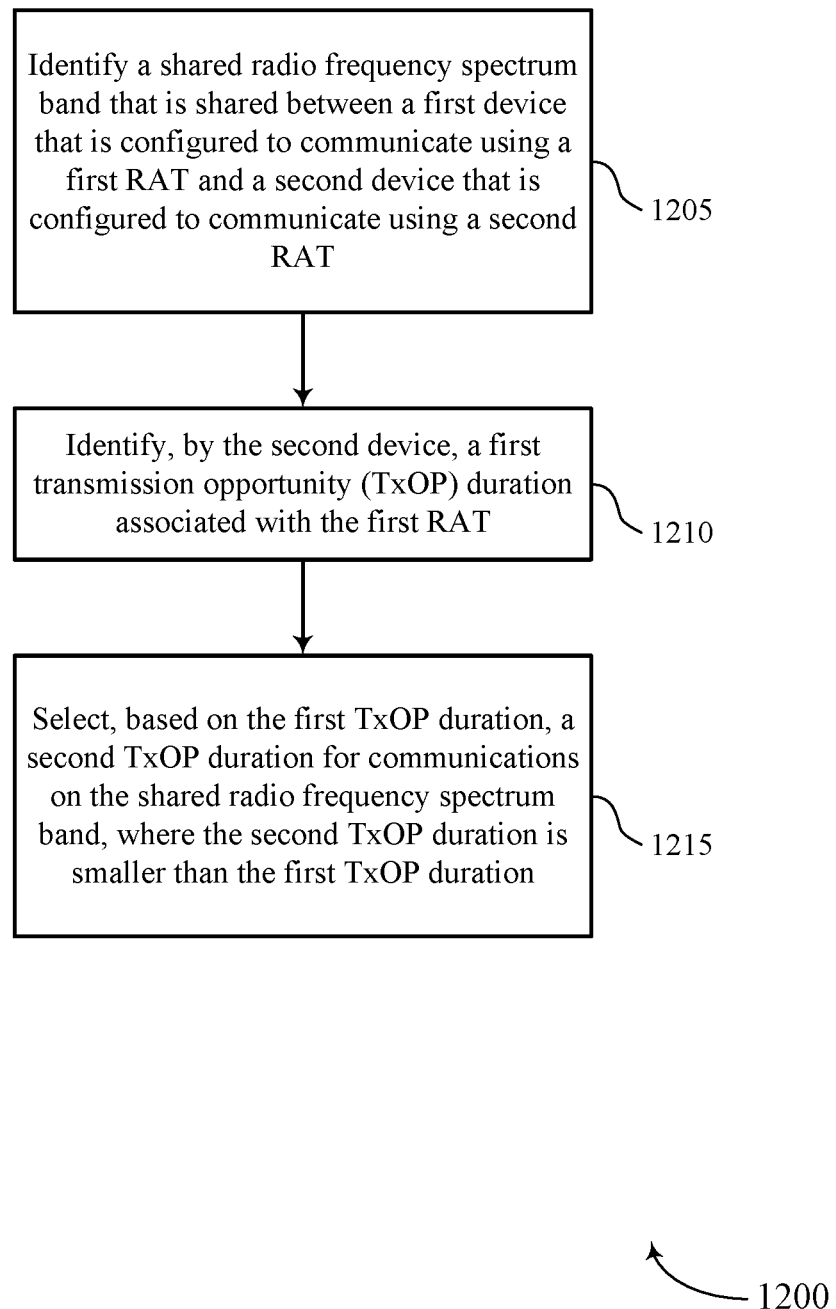

FIG. 12 shows a flowchart illustrating a method 1200 for 5G cellular V2X design principles in accordance with aspects of the present disclosure. The operations of method 1200 may be implemented by a UE 115 or its components as described herein. For example, the operations of method 1200 may be performed by a cellular V2X manager as described with reference to FIGS. 6 through 9. In some examples, a UE 115 may execute a set of codes to control the functional elements of the device to perform the functions described below. Additionally, the UE 115 may perform aspects of the functions described below using special-purpose hardware. In some aspects, the operations of method 1200 may be implemented by a UE 115 configured as a legacy device, e.g., configured for non-V2X communications.

At block 1205 the UE 115 may identify a shared radio frequency spectrum band that is shared between a first device that is configured to communicate using a first RAT and a second device that is configured to communicate using a second RAT. The operations of block 1205 may be performed according to the methods described herein. In certain examples, aspects of the operations of block 1205 may be performed by a shared spectrum manager as described with reference to FIGS. 6 through 9.

At block 1210 the UE 115 may identify, by the second device, a first TxOP duration associated with the first RAT. The operations of block 1210 may be performed according to the methods described herein. In certain examples, aspects of the operations of block 1210 may be performed by a TxOP manager as described with reference to FIGS. 6 through 9.

At block 1215 the UE 115 may select, based at least in part on the first TxOP duration, a second TxOP duration for communications on the shared radio frequency spectrum band, wherein the second TxOP duration is smaller than the first TxOP duration. The operations of block 1215 may be performed according to the methods described herein. In certain examples, aspects of the operations of block 1215 may be performed by a TxOP manager as described with reference to FIGS. 6 through 9.

It should be noted that the methods described above describe possible implementations, and that the operations and the functions may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of eNBs provide coverage for various geographical regions. For example, each eNB, next generation NodeB (gNB), or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and process 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary function that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
    decoding, by a first user equipment (UE) operating according to a first communication protocol, a control channel transmission of a safety message in a radio frequency spectrum band designated for safety messages for a vehicle-to-everything (V2x) system during a first portion of a time period from a second UE operating according to a second communication protocol different from the first communication protocol, wherein the control channel transmission indicates which resource blocks of the time period are allocated to the second UE;
    identifying, based at least in part on the decoding, a pool of resource blocks (RBs) that are available for a second portion of the time period; and
    selecting a subset of RBs from the pool of RBs for a transmission during the second portion of the time period.

2. The method of claim 1, further comprising:
    monitoring a plurality of channels during the first portion of the time period, the channels associated with control channel transmissions; and
    decoding one or more of the plurality of channels based at least in part on the monitoring.

3. The method of claim 1, further comprising:
    determining, based at least in part on the decoding, a time and frequency resources allocated for data transmissions scheduled for the second UE during the time period and at least one subsequent time period; and
    identifying the pool of RBs based at least in part on the determining.

4. The method of claim 1, further comprising:
    identifying, based at least in part on the decoding, an ordered list of available RBs for the pool of RBs; and
    selecting, according to the ordered list, the subset of RBs.

5. The method of claim 1, further comprising:
    selecting, according to a random selection scheme, the subset of RBs.

6. The method of claim 1, further comprising:
    hashing, based at least in part on a UE identifier and a RB index, the RBs in the pool of RBs; and
    selecting, according to the hashing, the subset of RBs.

7. The method of claim 1, further comprising:
    selecting the subset of RBs according to an ordered list of the RBs in the pool of RBs, a random selection scheme, a RB index hashed to a UE identifier, or combinations thereof.

8. The method of claim 1, wherein:
    the transmission during the second portion of the time period comprises a unicast transmission, a broadcast transmission, or combinations thereof.

9. The method of claim 1, wherein:
    the resource blocks of the time period allocated to the second UE comprise resource blocks for: long term evolution (LTE) license assisted access (LTE-LAA) communications, enhanced LTE-LAA communications, Wi-Fi communications, or MultiFire communications; and
    the transmission during the second portion of the time period comprises a vehicle-to-everything (V2x) transmission.

10. An apparatus for wireless communication, comprising:
    a processor;
    memory coupled with the processor; and
    instructions stored in the memory and operable, when executed by the processor, to cause the apparatus to:
        decode, by the apparatus associated with a first user equipment (UE) operating according to a first communication protocol, a control channel transmission of a safety message in a radio frequency spectrum band designated for safety messages for a vehicle-to-everything (V2x) system during a first portion of a time period from a second UE operating according to a second communication protocol different from the first communication protocol UE, wherein the control channel transmission indicates which resource blocks of the time period are allocated to the second UE;
        identify, based at least in part on the decoding, a pool of resource blocks (RBs) that are available for a second portion of the time period; and
        select a subset of RBs from the pool of RBs for a transmission during the second portion of the time period.

11. The apparatus of claim 10, wherein the instructions are further executable by the processor to:
    monitor a plurality of channels during the first portion of the time period, the channels associated with control channel transmissions; and
    decode one or more of the plurality of channels based at least in part on the monitoring.

12. The apparatus of claim 10, wherein the instructions are further executable by the processor to:
    determine, based at least in part on the decoding, a time and frequency resources allocated for data transmissions scheduled for the second UE during the time period and at least one subsequent time period; and
    identify the pool of RBs based at least in part on the determining.

13. The apparatus of claim 10, wherein the instructions are further executable by the processor to:
    identify, based at least in part on the decoding, an ordered list of available RBs for the pool of RBs; and
    select, according to the ordered list, the subset of RBs.

14. The apparatus of claim 10, wherein the instructions are further executable by the processor to:
    select, according to a random selection scheme, the subset of RBs.

15. The apparatus of claim 10, wherein the instructions are further executable by the processor to:
    hash, based at least in part on a UE identifier and a RB index, the RBs in the pool of RBs; and
    select, according to the hashing, the subset of RBs.

16. The apparatus of claim 10, wherein the instructions are further executable by the processor to:

select the subset of RBs according to an ordered list of the RBs in the pool of RBs, a random selection scheme, a RB index hashed to a UE identifier, or combinations thereof.

17. The apparatus of claim 10, wherein:

the transmission during the second portion of the time period comprises a unicast transmission, a broadcast transmission, or combinations thereof.

18. The apparatus of claim 10, wherein:

the resource blocks of the time period allocated to the second UE comprise resource blocks for: long term evolution (LTE) license assisted access (LTE-LAA) communications, enhanced LTE-LAA communications, Wi-Fi communications, or MultiFire communications; and the transmission during the second portion of the time period comprises a vehicle-to-everything (V2x) transmission.

19. The method of claim 1, wherein the safety message is related to traffic in the V2X system including traffic signaling, traffic timing, real-time traffic, real-time traffic routing, safety alerts to a pedestrian or bicyclist, collision avoidance information, or combinations thereof.

20. The method of claim 1, wherein the control channel transmission is transmitted over a basic safety message (BSM) channel within the radio frequency spectrum band designated for safety messages.

21. The method of claim 1, wherein the safety message is transmitted outside of a basic safety message (BSM) channel.

22. The method of claim 1, wherein the pool of RBs includes all RBs that are unallocated for wireless transmissions by the second UE during the time period.

23. The apparatus of claim 10, wherein the safety message is related to traffic in the V2X system including traffic signaling, traffic timing, real-time traffic, real-time traffic routing, safety alerts to a pedestrian or bicyclist, collision avoidance information, or combinations thereof.

24. The apparatus of claim 10, further comprising:

a transceiver coupled with the processor, wherein the instructions comprise instructions stored in the memory and operable, when executed by the processor, to cause the transceiver of the apparatus to transmit the control channel transmission over a basic safety message (BSM) channel within the radio frequency spectrum band designated for safety messages.

25. The apparatus of claim 10, wherein the safety message is transmitted outside of a basic safety message (BSM) channel.

26. The apparatus of claim 10, wherein the pool of RBs includes all RBs that are unallocated for wireless transmissions by the second UE during the time period.

* * * * *